United States Patent

Munetsugu et al.

[11] Patent Number: 6,141,431
[45] Date of Patent: *Oct. 31, 2000

[54] IMAGE PROCESSING APPARATUS

[75] Inventors: Toshihiko Munetsugu, Moriguchi; Masamichi Nakagawa, Hirakata; Yoshiyasu Kado, Matsudo; Fumio Maehara, Moriguchi, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/595,224

[22] Filed: Feb. 1, 1996

[30] Foreign Application Priority Data

Feb. 2, 1995  [JP]  Japan ..................................... 7-016143
Mar. 30, 1995 [JP]  Japan ..................................... 7-073371

[51] Int. Cl.⁷ ............................. G06K 9/00; G09B 19/10
[52] U.S. Cl. ............................ 382/100; 348/597; 434/94; 434/371
[58] Field of Search .................... 382/100, 162, 382/266, 282, 284, 294, 115, 117, 118, 283; 348/77, 584, 586, 590, 597, 78; 358/453, 538, 452; 395/135; 434/94, 371

[56] References Cited

U.S. PATENT DOCUMENTS

| | | | |
|---|---|---|---|
| 4,393,394 | 7/1983 | McCoy | 358/22 |
| 4,539,585 | 9/1985 | Spackova et al. | 358/93 |
| 4,823,476 | 4/1989 | Curtin | 33/512 |
| 4,872,056 | 10/1989 | Hicks et al. | 358/183 |
| 5,060,171 | 10/1991 | Steir et al. | 395/135 |
| 5,264,933 | 11/1993 | Rosser et al. | 358/183 |
| 5,576,778 | 11/1996 | Fujie et al. | 351/177 |
| 5,577,179 | 11/1996 | Blank | 395/135 |

FOREIGN PATENT DOCUMENTS

| | | |
|---|---|---|
| 0 556 476 A1 | 8/1993 | European Pat. Off. . |
| 5-197793 | 11/1990 | Japan . |
| 4-199474 | 1/1992 | Japan . |

OTHER PUBLICATIONS (1) Gregory Y. Tang et al., "An IBM–PC Based Hair Styling System," Proceedings, vol. III, NCGA '88, Ninth Annual Conference and Exposition, Anaheim, CA, Mar. 20–24, 1988, pp. 391–399.
(2) European Search Report.

*Primary Examiner*—Jon Chang
*Assistant Examiner*—Jayanti K. Patel
*Attorney, Agent, or Firm*—Ratner & Prestia

[57] ABSTRACT

An image processing apparatus has a hair region selecting part 11 for selecting hair and shade of the hair in a front face image 13, as a removal region 15, on the basis of each pixel value of the front face image 13 which is a front image of a face, and a face surface model 14 showing structural information relative to a surface of the face in the front face image 13, and a removal region changing part 12 for changing each pixel value in whole or part of the removal region 15, on the basis of the structural information in the face surface model 14, and at least one pixel value in the front image.

19 Claims, 21 Drawing Sheets

Fig. 5
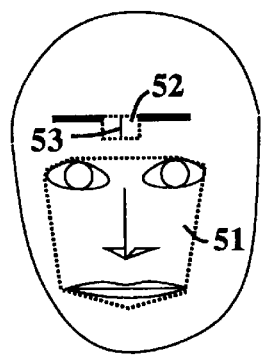
Fig. 6 (a)
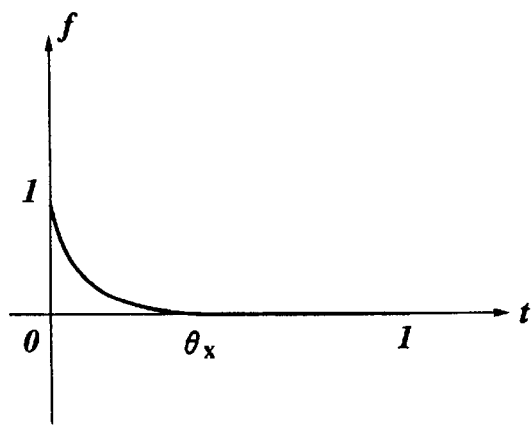
Fig. 6 (b)
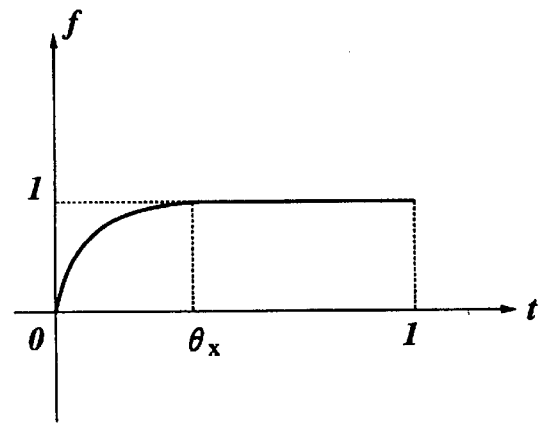
Fig. 7
| 0.0625 | 0.0625 | 0.0625 |
|--------|--------|--------|
| 0.0625 | 0.5    | 0.0625 |
| 0.0625 | 0.0625 | 0.0625 |

IMAGE PROCESSING APPARATUS

BACKGROUND OF THE INVENTION

1. Field of the Invention

The present invention relates to an image processing apparatus capable of displaying the hair style by replacing with other automatically in real time without strange feel, in computer graphics of human figures.

2. Related Art of the Invention

Hitherto, in image processing for assigning other hair style in an image of a certain person, when generating the image of the person minus the hair as preprocessing of the image processing, the image minus the hair was obtained by taking in the image of the face not covered with the hair taken by bundling the hair, or removing manually the hair region of the image of the person.

When assigning other hair to the obtained image without hair, other hair was pasted to the image minus hair by manual work.

In such conventional method, however, if the image is taken by bundling the hair, the hair is not completely removed but may be partly left over, and the original hair is left over in the image obtained by image processing of assigning other hair.

In manual work for removing the hair, meanwhile, it took a long time.

Still more, there was a considerable feel of strangeness in the image obtained by the conventional image processing for pasting other hair to the image without hair.

SUMMARY OF THE INVENTION

It is hence a primary object of the invention to present an image processing apparatus for removing the hair from the front image of the face, estimating the profile of the head in the hair removed area, and painting the estimated range of the head solidly with the skin color of the face.

It is also an object of the invention to present an image processing apparatus for processing the image without strange feel, by adjusting other hair so as to match the front image of the face, and using the color information within the contour of the face.

A first aspect of the invention relates to an image processing apparatus comprising a region selecting part for selecting a region of a specific portion in a front image of a person, on the basis of each pixel value in whole or part of the front image, and a surface model showing structural information relative to a surface of the person in the front image, and a region changing part for changing each pixel value in whole or part of the region of the specific portion, on the basis of the structural information in the surface model, and at least one pixel value in the front image.

Incidentally, the front image may be a front face image which is a front image of a face of the person, the surface model may be a face surface model showing structural information relative to a surface of the face of the person in the front face image, the region selecting part may be a hair region selecting part for selecting a hair region of the person in the front face image in a removal region, and the region changing part may be a removal region changing part for changing each pixel value in whole or part of the removal region, on the basis of the structural information in the face surface model, and color information obtained from at least one pixel value in the front face image.

The hair region selecting part may select the hair of the person and shade by the hair in the front face image as the removal region.

The hair region selecting part may further change each pixel value in the removal region to other values than the pixel values in the front face image corresponding to inside of head contour in the face surface model.

When pixel values in part of the removal region are changed, the removal region changing part may further change the pixel values in a remainder of the removal region to other values than the pixel values in the front face image corresponding to inside of head contour in the face surface model.

The hair region selecting part may select the hair and the shade of the hair in the removal region, on the basis of head contour, eyes and eyebrows in the face surface model.

The hair region selecting part may select the hair and the shade of the hair in the removal region, on the basis of lightness of each pixel in the front face image.

The hair region selecting part may select the hair and the shade of the hair in the removal region, on the basis of lightness and saturation of each pixel in the front face image.

The image processing apparatus may further comprise a fluctuation generating part for adding specific fluctuation component to each pixel value in the removal region, on the basis of color information of at least one pixel in the front face image, wherein at least one pixel in the front face image is not included in the removal region.

The image processing apparatus may further comprise a face surface model generating part for generating the face surface model, on the basis of the front face image.

A second aspect of the invention relates to an image processing apparatus comprising an image adjusting part for, on the basis of a surface model showing structural information relative to a surface of a person in a front image of the person, and information model showing structural information relative to a surface of other person in a reference image which is a front image of the other person, applying a specific conversion to attribute information and the reference image so that a specified portion of the other person may be suited to the front image, the attribute information being information held by corresponding attribute of each pixel in the reference image to the pixel, and a synthesis processing part for assigning the front image for a specific portion in the reference image in which the specific conversion is applied, according to the attribute information in which the specific conversion is applied.

Incidentally, the front image of the person may be a front face image which is a front image of a face of the person, the surface model may be a face surface model showing structural information relative to a surface of the face of the person, the reference image may be a head image which is a front image of a face of the other person having hair, the information model may be a face information model showing structural information relative to a surface of the face of the other person in the head image, the specific portion may be head portion comprising the hair, or the hair and shade of the hair, the attribute information may be hair information held by corresponding the attribute of each pixel in the head image to the pixel, the image adjusting part may be a head image adjusting part for applying the specific conversion to the hair information and the head image, and the synthesis processing part may be a head synthesis processing part for assigning the front face image for the head portion in the head image in which the specific conversion is applied, according to the hair information in which the specific conversion is applied.

The head image adjusting part may apply the specific conversion to the head image and the hair information, by utilizing information of head contour and whole or part of eyes, nose, mouth and eyebrows in the face surface model, and information of head contour and whole or part of eyes, nose, mouth and eyebrows in the face information model.

The head synthesis processing part may comprise a generating part for generating pixels values of the head portion to be assigned to the front face image, according to the attribute of each pixel of the hair information, by using pixel value of the head image corresponding to the pixel of the attribute, or using the pixel value of the head image and pixel value of the front face image, corresponding to the pixel of the attribute, and a mapping processing part for assigning the front face image for each pixel value of the head portion generated by the generating part.

The image processing apparatus may further comprise a synthesis image correcting part for correcting the front face image in which the head portion is assigned by the mapping processing part.

The generating part may comprise at least one of a hue synthesis part for generating, according to the attribute, a hue by using the pixel value of the head image corresponding to the pixel of the attribute, or using the pixel value of the head image and the pixel value of the front face image, corresponding to the pixel of the attribute, a lightness synthesis part for generating, according to the attribute, a lightness by using the pixel value of the head image corresponding to the pixel of the attribute, or using the pixel value of the head image and the pixel value of the front face image, corresponding to the pixel of the attribute, and a saturation synthesis part for generating, according to the attribute, a saturation by using the pixel value of the head image corresponding to the pixel of the attribute, or using the pixel value of the head image and the pixel value of the front face image, corresponding to the pixel of the attribute.

The image processing apparatus may further comprise a face surface model generating part for generating the face surface model on the basis of the front face image.

A third aspect of the invention relates to an image processing apparatus comprising a region selecting part for selecting a region of a specific portion in a front image of a person, on the basis of each pixel value in whole or part of the front image, and a surface model showing structural information relative to a surface of the person in the front image, a region changing part for changing each pixel value in whole or part of the region of the specific portion, on the basis of the structural information in the surface model, and at least one pixel value in the front image, an image adjusting part for, on the basis of the surface model, and information model showing structural information relative to a surface of other person in a reference image which is a front image of the other person, applying a specific conversion to attribute information and the reference image so that a specified portion of the other person may be suited to the front image, the attribute information being information held by corresponding attribute of each pixel in the reference image to the pixel, and a synthesis processing part for assigning the front image for a specific portion in the reference image in which the specific conversion is applied, according to the attribute information in which the specific conversion is applied.

A fourth aspect of the invention relates to an image processing apparatus comprising a hair region selecting part for, on the basis of each pixel value in whole or part of a front face image which is a front image of a face, and a face surface model showing structural information relative to a surface of the face in the front face image, selecting hair in the front face image, or the hair and shade of the hair in a removal region, a removal region changing part for changing each pixel value in whole or part of the removal region, on the basis of the structural information in the face surface model, and color information obtained from at least one pixel value in the front face image, a head image adjusting part for, on the basis of the face surface model, and a face information model showing structural information relative to a surface of other face in a head image which is a front image of the other face having hair, applying a specific conversion to hair information and head image so that head portion may be suited to the front face image, the head portion being the hair of the other person, or the hair and shade of the hair, the hair information being information held by corresponding attribute of each pixel of the head image to the pixel, and a head synthesis processing part for assigning the front face image for the head portion in the head image in which the specific conversion is applied, according to the hair information in which the specific conversion is applied.

Incidentally, the image processing apparatus may further comprise an image display part for displaying plural front face images assigned with the head portion by the head synthesis processing part.

BRIEF DESCRIPTION OF THE DRAWINGS

These and other objects, advantages, features, and uses will become more apparent as the description proceeds, when considered with the accompanying drawings in which:

FIG. 5 is a diagram for explaining the operation of image value change by a removal region changing part 12;

FIG. 6(a) is a characteristic diagram of f in Eq. 7;

FIG. 6(b) is a characteristic diagram of f in Eq. 8;

FIG. 7 is a structural diagram of a filter used in smoothing;

DESCRIPTION OF PREFERRED EMBODIMENTS

Embodiment 1

Figure 1:
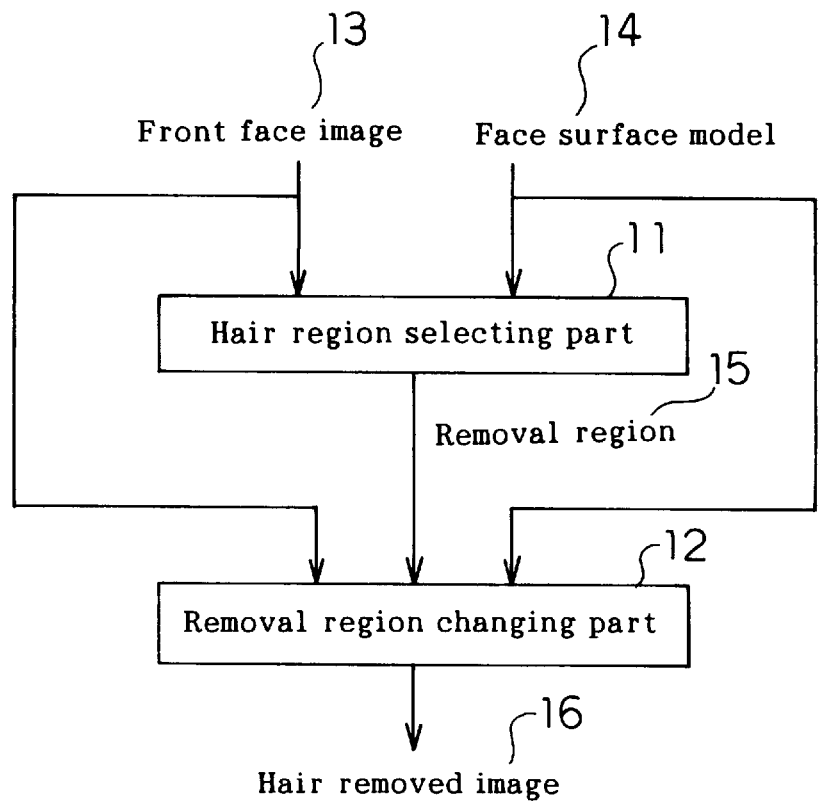
FIG. 1 is a block diagram of an image processing apparatus in a first embodiment of the invention.

Referring now to FIG. 1, there is shown therein a block diagram of an image processing apparatus in a first embodiment of the invention. In FIG. 1, the image processing apparatus of the embodiment comprises a hair region selecting part 11 and a removal region changing part 12. The hair region selecting part 11, using a front face image 13 (FIG. 3) which is a front image from the neck up, and a face surface model 14 (FIG. 4) showing structural information of parts above the face corresponding to the front face image 13, determines the region of the hair in the front face image 13 and the shade by the hair (not shown in FIG. 3) as removal region 15, and sends out the removal region 15. In the face surface model 14 shown in FIG. 4, however, the ears are removed.

The removal region changing part 12 changes pixel values of whole or part of the removal region 15 in the front face image 13, in consideration of the information of the face surface model 14, and on the basis of pixel values of the face in the front face image 13, and generates a hair removed image 16. When pixels of part of the removal region are changed, the removal region changing part 12 changes pixel values of the remaining part of the removal region 15, by using other values than the pixel values of the face in the front face image 13.

Figure 2:
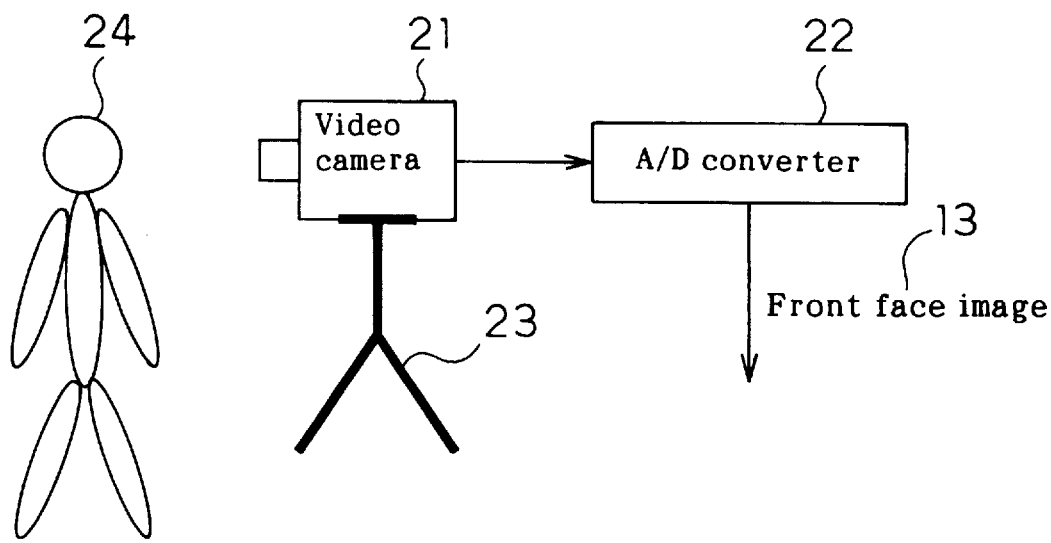
FIG. 2 is a diagram showing an example of face image take-in device for taking in a front face image 13.

FIG. 2 is a diagram showing an example of a face image take-in device for taking in the front face image 13. The front face image 13 is a digital image taken in by the face image take-in device. In FIG. 2, reference numeral 21 is a video camera for image pickup, 22 is an A/D converter for converting the image of the video camera 21 into digital data, 23 is a device for fixing the video camera 21, and 24 is the object figure taken by the video camera 21.

The video camera 21 is fixed horizontally by the device 23. The A/D converter 22 converts the analog image taken by the video camera 21 into digital image, and generates the front face image 13. The front face image 13 is in a size of 256×256 pixels, being a color image in a width of 8 bits each of R, G, B per pixel. The background color of the front face image 13 is monochromatic.

Figure 3:
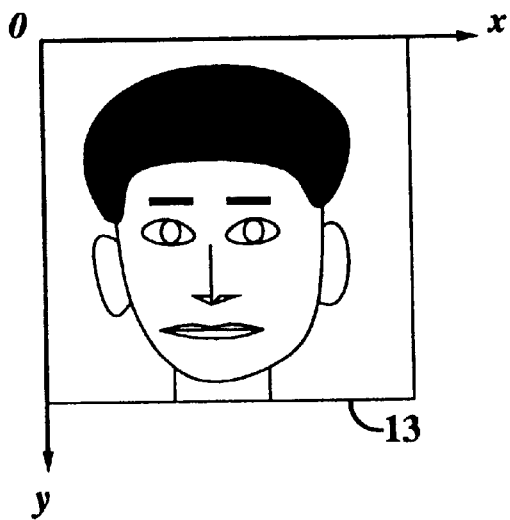
FIG. 3 is a diagram showing an example of the front face image 13 taken in by the face image take-in device shown in FIG. 2.

FIG. 3 is a diagram showing an example of front face image 13 taken in by the face image take-in device shown in FIG. 2. The front face image 13 in FIG. 3 is the whole face from the neck up in the front view. The face is expressionless, without glasses and beard, and the center line of the head is almost perpendicular. The hair does not cover the entire forehead. The xy coordinates are incorporated in this front face image 13.

Figure 4:
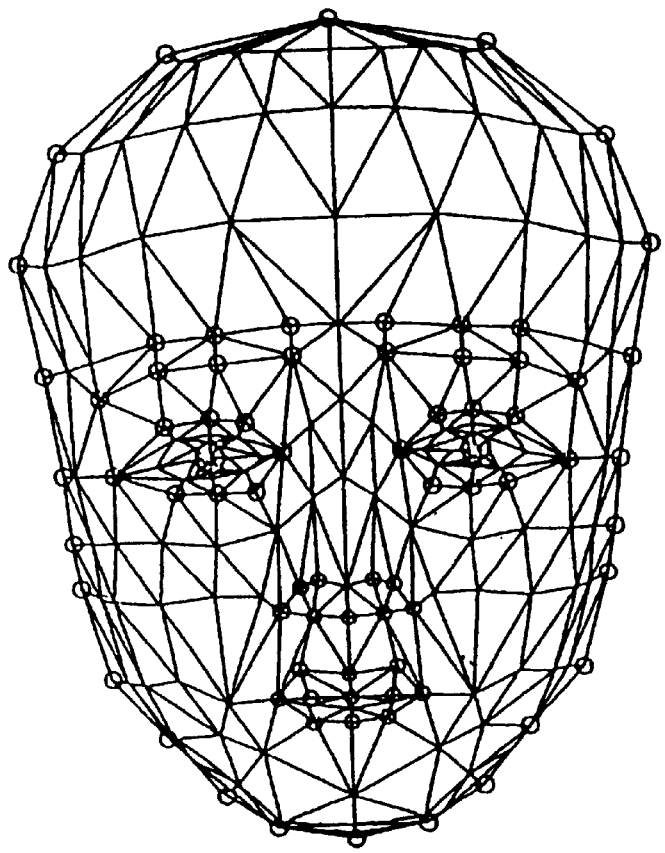
FIG. 4 is a diagram of wire frame model showing an example of a face surface model 14.

FIG. 4 is a diagram of a wire frame model showing an example of face front model 14. The vertices of the wire frame consist of the points obtained in consideration of three-dimensional structure of the face, placed at feature points representing the face contour, eyes, nose, mouth and eyebrow, and between the feature points. Feature points in FIG. 4 refer to circled vertices.

Each vertex has the data of x-coordinate and y-coordinate on the image. Each vertex is numbered specifically, and the position of the vertex on the image is identified by the number. The face surface model 14 is composed of these vertices and their linkage information.

This face surface model 14 is generated by recognizing the face in the front face image 13 in FIG. 3. That is, it is generated by recognizing the face in the front face image 13, and moving the vertices of the prepared standard wire frame model according to the recognized face.

Therefore, the face surface model 14 differs in the shape of the frame depending on the individual person, but is same in topology. In the process to generate the face surface model 14, the prior art disclosed in Japanese Laid-open Patents No. 5-197793, No. 4-199474 and others may be employed. Japanese Laid-open Patent Nos. 5-197793 and 199474 are incorporated herein by reference.

The operation of this embodiment is described below.

The hair region selecting part 11 receives the front face image 13 and face surface model 14, and delivers the region of the hair in the front face image 13 and the shade by the hair as a removal region 15.

The removal region changing part 12 receives the front face image 13, face surface model 14, and removal region 15. The removal region changing part 12 changes pixel values of the front face image 13 inside of the outer circumferential contour (hereinafter called head contour) of the face surface model 14, and inside of the removal region 15. To change the pixel values, at least one pixel existing near the outer circumference of the removal region 15 is used.

The removal region changing part 12 applies a specific conversion to at least one pixel value existing near the outer circumference of the removal region 15, depending on the position of the pixel, in each pixel subject to change of pixel value, and converts the pixel value at the position to the value generated by the conversion.

When all region of the pixels converted in pixel values is part of the removal region 15, the removal region changing part 12 changes the remainder of the removal region 15 to other values than the pixel values within the head contour of the front face image 13. As a result, a hair removed image 16 is generated.

In the embodiment, the hair region selecting part 11 delivers the removal region 15, but it may also change the pixel values in the removal region 15 into specific values, and deliver the removal region 15. In this case, the removal region changing part 12, considering the information of the face surface model 14, changes whole or part of the removal region 15 and generates the hair removed image 16, on the basis of at least one pixel value near the outer circumference of the removal region 15, in the head contour in the front face image 13.

The operation of the hair region selecting part 11 and removal region changing part 12 in the embodiment is specifically described below. The hair region selecting part 11 is designed to estimate the region of the hair and the hair shade, depending on the lightness of each pixel obtained from the color information. The hair region selecting part 11 and removal region changing part 12 both convert into hue, lightness, and saturation, not color information of R, G, B, and employ information normalized into integer values from 0 to 255.

The specific operation of the hair region selecting part 11 is described first. The skin and hair can be separated also by the hue. However, in the front face image 13 taken by the video camera 21 and generated by conversion by the A/D converter 22, since noise is mixed in the hue, the skin and hair cannot be separated correctly. By the hue, yet, the hair shade and skin can be hardly separated. In the removal region changing part 12, if the hair shade is left over, when the pixel values of the removal region 15 are changed, the color is dark after change, and favorable results may not be obtained.

In the embodiment, therefore, by using the lightness instead of the hue, the region of the hair and the shade of the hair is determined as the removal region 15. That is, the portion smaller in the lightness is supposed to be the hair or the shade of the hair.

First, of each pixel of the front face image 13 corresponding to the inside of the head contour of the face surface model 14, the average La and maximum Lm of the lightness of the pixel of which lightness L satisfies Eq. 1 are determined. The condition of Eq. 1 is intended to eliminate the effects of evidently dark portion, and $\theta 10$ is the threshold value. For example, $\theta 10=65$.

$$L < \theta 10 \quad \text{(Eq. 1)}$$

Using La and Lm, the threshold $\theta 11$ is determined from Eq. 2.

$$\theta 11 = \min(\alpha \cdot La, \beta \cdot Lm) \quad \text{(Eq. 2)}$$

In Eq. 2, $\alpha$ and $\beta$ are certain real numbers. For example, $\alpha=1.3$ and $\beta=0.8$. The function min(a, b) is the function for taking either "a" or "b", whichever not greater. Using $\theta 11$ determined in Eq. 2 as the threshold, the portion of the hair or the shade of the hair is supposed. That is, in the head contour, the set of pixels of which lightness L satisfies Eq. 3 is supposed to be the removal region 15.

$$L < \theta 11 \quad \text{(Eq. 3)}$$

Finally, the eyebrows, eye, nose, and mouth are the regions that must not be removed, and if they are included in the removal region 15, they are excluded from the removal region 15.

A specific operation of the removal region changing part 12 is described below. Processing of pixel value change of the removal region changing part 12 is executed sequentially from bottom to top in every horizontal scanning line, in the region within the head contour. That is, supposing the line segment of the section cutting the region within the head contour by line y=y0 to be F=[xs, xe], the pixel value change is processed on this line segment F. After processing of the line segment F, the pixel value change is processed on the line segment F1=[xs1, xe1] of the section cutting the region within the head contour by line y=y0−1.

FIG. 5 is a diagram for explaining the operation of the pixel value change by the removal region changing part 12.

In FIG. 5, the eyes, nose and mouth are included in a region 51 enclosed by dotted lines at the lower side. When the removal region 15 contains the pixels in this region 51, the removal region changing part 12 excludes the pixels in this region 51 from the removal region 15.

When the pixel values in part of the removal region are changed, the removal region changing part 12 further changes the pixel values in a remainder of the removal region to other values than the pixel values in the front face image corresponding to the inside of the head contour in the face surface model.

When pixels positioned on a line segment 53 which is a set of middle points in the horizontal direction in a region 52 enclosed by dotted lines at the upper side are contained in the removal region 15, the removal region changing part 12 removes the individual pixels from the removal region 15, supposing the hue of each pixel to be the hue of a proper pixel between the eyes, its lightness to be La, and the saturation to be the average Sa of the saturation of the pixel of which lightness L in the head contour satisfies Eq. 1.

The removal region changing part 12 determines a set of continuous pixels included in the removal region 15, of the pixels on the line segment F at y=y0, the pixel values are changed sequentially from the lower side of the x-coordinate in every set. The x-coordinates of both end points of one set are supposed to be x0, x1, respectively.

In this case, if x0=xs and x1=xe, changing process of a specific pixel value is needed. It means that change of pixel values of the entire line segment F is needed, and that pixel values in the line segment F cannot be used at all in the change of the pixel values.

Thus, it is only the region above the eyebrow that x0=xs and x1=xe, and in this case, therefore, pixel values for change are obtained the line segment F'=[xs', xe'] of the section cutting the region within the head contour at y=y0+1. That is, supposing the middle points of F, F' to be xc, xc', and the x-coordinate of an arbitrary point P on the line segment F to be X, point P'(X', y0+1) on the line segment F' is determined by Eq. 4.

$$X' = \begin{cases} xc' - \dfrac{(xc - X)(xc' - xs')}{xc - xs} & [X < xc] \\ xc' & [X = xc] \\ xc' + \dfrac{(X - xc)(xe' - xc')}{xe - xc} & [X > xc] \end{cases} \quad \text{(Eq. 4)}$$

The color of pixel at this point P' is the color of pixel of point P. However, when point P' is a point within the eyebrow region, the pixel value of this point P is not changed but is left over, and this change is processed on the entire line segment F, and it is interpolated by linear interpolation.

On the other hand, processing in the case of x0≠xs or x1≠xe is explained. In this case, the removal region changing part 12 picks up a plurality of hues used in the change of pixel values from part of the head contour region, and uses sequentially. For example, 5×5 blocks are picked up from between the eyebrows, and they are sequentially processed by mapping. The lightness assigned to the pixel of point (x0, y0) is supposed to be L0 and the saturation is supposed to be S0. The lightness assigned to the pixel of point (x1, y0) is supposed to be L1 and the saturation is supposed to be S1. The lightness L and saturation S to be mapped to the pixel of point P(X, y0) in the set are determined in Eq. 5.

$$L = L0 \cdot f(x0, x1, X) + L1 \cdot (1 - f(x0, x1, X))$$
$$S = S0 \cdot f(x0, x1, X) + S1 \cdot (1 - f(x0, x1, X)) \quad \text{(Eq. 5)}$$

In Eq. 5, f is the function with the value of $0 \leq f \leq 1$.

In this embodiment, dividing into three cases of x0≠xs and x1≠xe, x0=xs, and x1=xe, L0, S0, L1, S1, and f were determined as follows.

In the case of x0≠xs and x1≠xe, L0 and S0 are values of the pixel of point (x0−1, y0), and L1 and S1 are supposed to be values of the pixel of point (x1+1, y0). The pixel values between the pixel of point (x0−1, y0) and pixel of point (x1+1, y0) are changed by using the pixels at these two points. That is, interpolation is linear interpolation. Hence, f is determined in Eq. 6.

$$f(x0, x1, X) = \frac{X - x0}{x1 - x0} \quad \text{(Eq. 6)}$$

In the case of x0=xs, L0 and S0 are values of the pixel of a point on the head contour line at y=y0+1. However, if it is contained in the removal region 15, the average values of the lightness and saturation of the skin near the head contour line are used. The values of pixel of point (x1+1, y0) are L1 and S1. As f, the value calculated from Eq. 7 is used.

$$f(x0, x1, X) = \begin{cases} 1 - \sqrt{\frac{t}{\theta x}} & [t < \theta x] \\ 0 & [t \geq \theta x] \end{cases}, \left[ t = \frac{X - xs}{x\theta - xs} \right] \quad \text{(Eq. 7)}$$

The characteristic diagram of f is shown in FIG. 6 (a). In Eq. 7, θx is a certain real number, for example, θx=0.4.

In the case of x1=xe, L1 and S1 are values of the pixel of a point on the head contour line at y=y0+1. However, it is included in the removal region 15, the average values of lightness and saturation of skin near the head contour line are used. Values of the pixel of point (x0−1, y0) are L0 and S0. As f, the value calculated from Eq. 8 is used.

$$f(x0, x1, X) = \begin{cases} \sqrt{\frac{t}{\theta x}} & [t < \theta x] \\ 1 & [t \geq \theta x] \end{cases}, \left[ t = \frac{xe - X}{xe - xs} \right] \quad \text{(Eq. 8)}$$

The characteristic diagram of f is shown in FIG. 6(b). Meanwhile, θx is same as the value in Eq. 7.

Finally, the lightness and saturation of the pixel value changing region and its vicinity are smoothed. As a example of smoothing, the 3×3 filter shown in FIG. 7 is used. That is, supposing the lightness and saturation of the pixel of point P(x, y) to be L(x, y), and S(x, y), respectively, the lightness L'(x, y) and saturation S'(x, y) of point P after smoothing are given from Eq. 9.

$$L'(x, y) = \sum_{i=-1}^{1} \sum_{j=-1}^{1} a_{ij} \cdot L(x + i, y + j) \quad \text{(Eq. 9)}$$

$$S'(x, y) = \sum_{i=-1}^{1} \sum_{j=-1}^{1} a_{ij} \cdot S(x + i, y + j)$$

$a_{oo}=0.5$, $a_{ij}=0.0625$ ($i=j \neq 0$ and $-1 \leq i,j \leq 1$)

By using a 32-bit personal computer mounting medial processing board with DSP, it took about 3 seconds in the above processing.

This embodiment is intended to process the digital image taken by the video camera 21, being converted by the A/D converter 22 in a size of 256×256 pixels, and same effects are obtained in the digital image of other size, or digital image taken by scanner or the like. The composition of the face information model 14 is not limited to the one shown in FIG. 4, and similar effects are obtained as far as the eyes, nose, mouth, eyebrows and head contour are clear.

Embodiment 2

An image processing device in a second embodiment of the invention is described. This embodiment differs from the firs t embodiment only in the operation of the hair region selecting part 11. This portion is described below.

Figure 8:
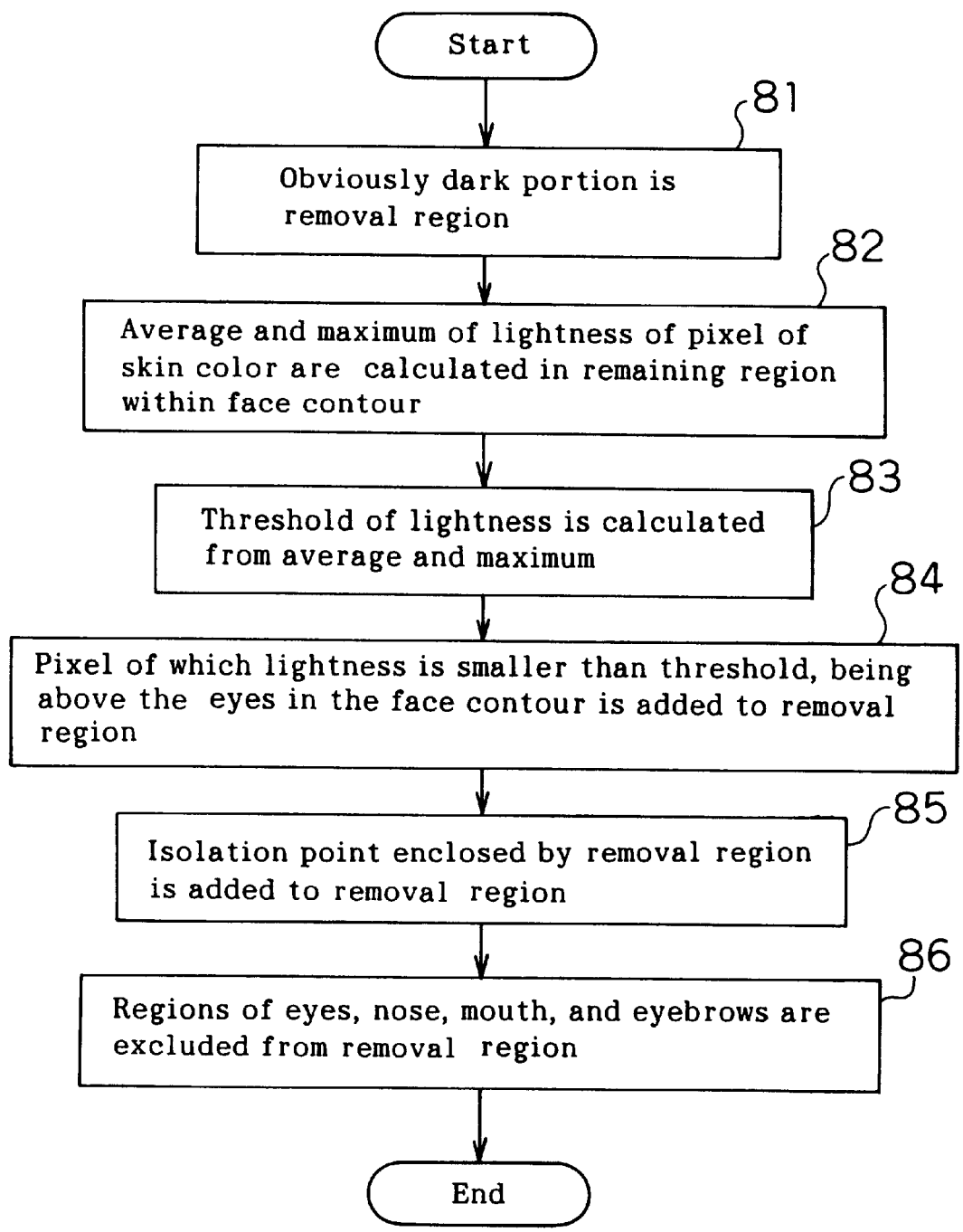
FIG. 8 is a flowchart showing the procedure of processing a hair region selecting part 11 in a second embodiment.

FIG. 8 is a flowchart showing the procedure of processing of the hair region selecting part 11 in the embodiment. The operation at each step of this flowchart is described.

Step 81: The hair region selecting part 11 assumes the lightness of an arbitrary point of the front face image 13 to be L, the threshold to be θ10, and the set of pixels satisfying Eq. 1 to be removal region 15. For example, θ10=65.

Step 82: The hair region selecting part 11 determines the average La and maximum Lm of the lightness of the pixel of which hue H satisfies the condition of Eq. 10, among the pixels within the head contour above the position of the eyebrows obtained from the face surface model 14 and not contained in the removal region 15.

$$\theta h0 \leq H \leq \theta h1 \quad \text{(Eq. 10)}$$

The conditions of Eq. 10 are intended to eliminate the effects of the pixels other than the skin and the pixels containing noise, and θh0 and θh1 are thresholds. For example, θh0=1, θh1=30.

Step 83: The hair region selecting part 11 determines the threshold θ11 of the lightness in Eq. 2. Herein, α, β are real numbers, for example, α=1.15, β=0.8.

Step 84: The hair region selecting part 11 contains the pixels within the head contour above the eye position obtained from the face surface model 14, of which lightness L satisfies Eq. 3, in the removal region 15.

Step 85: The hair region selecting part 11 divides the pixels within the head contour and not contained in the removal region 15 into regions by 4-connected points, and contains the regions of which number of constituent elements is smaller than θn in the removal region 15 as isolated point. Herein, θn is the threshold, for example, θn=10.

Step 86: The hair region selecting part 11 finally excludes the pixels contained in the regions of the eyes, nose, mouth and eyebrows, which are regions not to be removed, from the removal region 15.

Embodiment 3

An image processing apparatus is a third embodiment of the invention is described below. The constitution of the embodiment, the front face image 13, and face surface model 14 are same as in the first embodiment. As compared with the first embodiment, this embodiment differs in the operation of the hair region selecting part 11 and removal region changing part 12. This portion is described below.

First, the operation of the hair region selecting part 11 is described. In this embodiment, by using the lightness and saturation, the region of the hair and the shade of the hair is supposed to be removal region 15. That is, the portion small in lightness or the portion somewhat large in lightness but small in saturation is supposed to be hair or the shade of the hair.

First, the hair region selecting part 11 determines the average La and maximum Lm of lightness and average Sa and maximum Sm of saturation of the pixels in a region below the eyes in the head contour obtained from the face surface model 14, of which lightness L satisfies Eq. 11 and hue H satisfies Eq. 12.

$$L < \theta l0 \quad \text{(Eq. 11)}$$

$$\theta h0 \leq H \leq \theta h1 \quad \text{(Eq. 12)}$$

The conditions in Eq. 11 are to eliminate the effects of the obviously dark portion, and θl0 is the threshold. The conditions in Eq. 12 are to eliminate the effects of pixels other than the skin and pixels mixed with noise, and θh0 and θh1 are thresholds. For example, θl0=65, θh0=1, and θh1=30. The average and maximum in the region below the eyes are taken because it is possible to process even if the forehead is hardly covered with the hair.

The hair region selecting part 11 determines θl1 and θs from Eq. 13, by using La, Lm and Sa.

$$\theta l1 = \min(\alpha \cdot La, \beta \cdot Lm)$$

$$\theta S = \gamma \cdot Sa \quad \text{(Eq. 13)}$$

In Eq. 13, α, β, γ are real numbers. For example, α=1.15, β=0.8 and γ=0.8. Incidentally, min(a, b) is the function having either "a" or "b", whichever not greater.

The hair region selecting part 11, using θl1 and θs obtained in Eq. 13, determines the region of the hair and the shade of the hair as the removal region 15.

The hair region selecting part 11, first in the portion other than the eyes and eyebrows, determines the set of pixels of which lightness L and saturation S satisfy Eq. 14 or Eq. 15, as the removal region 15.

$$L < \theta l1 \quad \text{(Eq. 14)}$$

$$L < a \cdot \theta l1 \text{ and } S < \theta s \quad \text{(Eq. 15)}$$

In Eq. 15, a is a certain real number. For example, a=1.1.

Next, in the portion between the eyes and eyebrows, the hair region selecting part 11 includes the set of the pixels satisfying Eq. 16 in the removal region 15.

$$L < b \cdot \theta l \text{ and } S < \theta s \quad \text{(Eq. 16)}$$

In Eq. 16, b is a certain real number, for example, b=0.85. This is based on the consideration that the intermediate parts of the eyes and eyebrows are somewhat darker than the forehead and the like.

Moreover, the hair region selecting part 11 divides the pixels in the head contour and not included in the removal region 15, into regions by 4-connected pieces. The region of which number of constituent pixels is smaller than θn is included in the removal region 15 as isolated point. Herein, θn is the threshold, for example, θn=10.

Finally, since the eyes, nose, mouth, and eyebrows are regions not to be removed, the hair region selecting part 11 excludes the pixels in these regions, if contained in the removal region 15, from the removal region 15.

The operation of the removal region changing part 12 is described.

The removal region changing part 12 processes to change the pixels in every horizontal scanning line, sequentially from bottom to top, on the pixels in the head contour. That is, supposing the line segment of the section cutting the region in the head contour by line y=y0 to be F=[xs, xe], change of pixel values is processed on this line segment F. After processing of line segment F, pixels are changed in the line segment F1=[xs1, xe1] of the section cutting the face region by line y=y0−1.

Figure 9:
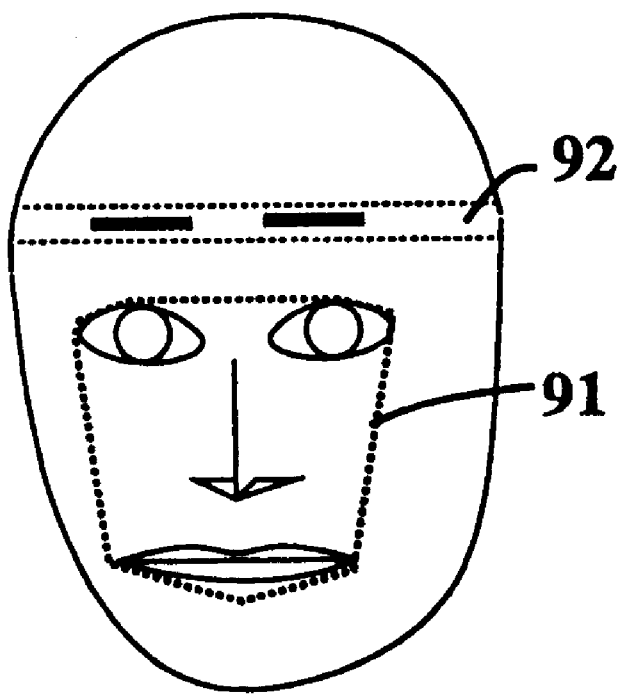
FIG. 9 is a diagram for explaining the operation of the removal region changing part 12 in a third embodiment.

FIG. 9 is a diagram for explaining the operation of the removal region changing part 12 in the embodiment. In FIG. 9, the removal region changing part 12 excludes the pixels in a region 91 enclosed dotted lines comprising the eyes, nose, and mouth, if contained in the removal region 15, from the removal region 15.

The removal region changing part 12 performs a special pre-processing before change of pixel values if the occupying rate of the removal region 15 is greater than θr in the region above the eyes in the head contour, assuming the forehead be covered almost completely with the hair. Herein, θr is the threshold, for example, θr=0.9.

In FIG. 9, a region 92 is a region composed of a horizontal scanning line including the eyebrows within the head contour and adjacent horizontal scanning lines above and beneath it. The removal region changing part 12, as its pre-processing, checks if the middle point is included in the removal region 15 or not, on the middle points of all line segments F in the region 92. The removal region changing part 12, when the middle point is included in the removal region 15, changes the hue of the pixel at the middle point to a value of hue of the pixel at a proper point between the eyes, and its lightness is changed to La and the saturation to Sa, and are excluded from the removal region 15.

The removal region changing part 12 determines the set of continuous pixels included in the removal region 15, on the line segment F at y=y0, and in every set of the pixels, the pixel values are changed sequentially from the smaller value of x-coordinate.

Suppose the x-coordinates of both ends of a set of a certain pixel to x0, x1 respectively.

In the case of x0=xs and x1=xe, herein, special processing is needed. This is a case of changing the pixel values of the line segment F, and pixel values in the line segment F cannot be used at all. It is only in the region above the eyes that x0=xs and x1=xe, and hence the removal region changing part 12 uses the pixel values in the line segment F'=[xs', xe'] in the section cutting the head contour by y=y0+1, in the change of pixel values in the line segment F.

That is, supposing the middle points of F, F' to be xc, xc', and the x-coordinate of an arbitrary point P on the line segment F to be X, the removal region changing part 12 determines the point P'(X', y0+1) of the line segment F' by Eq. 17.

$$X' = \begin{cases} xc' - \dfrac{(xc - X)(xc' - xs')}{xc - xs} & [X < xc] \\ xc' & [X = xc] \\ xc' + \dfrac{(X - xc)(xe' - xc')}{xe - xc} & [X > xc] \end{cases} \quad \text{(Eq. 17)}$$

The removal region changing part 12 supposes the color of the pixel of this point P' to be the color of the pixel of point P. However, when the point P' is a point in the eye region or eyebrow region, the point P is not changed but is left over. After processing this change in the entire line segment F, the remaining portion is changed in the pixel value by linear interpolation.

Explained next is the processing in the case of x0≠xs or x1≠xe. As the hue used in change of pixel values, a plurality of pixels are picked up from part of the head contour, and used sequentially. For example, picking up 5×5 pixel blocks from between the eyebrows, they are mapped sequentially. Supposing the lightness of a certain pixel after change to be L, and the saturation to be S, S is given in Eq. 18.

$$S = L \times \frac{Sa}{La} \qquad \text{(Eq. 18)}$$

This is to determine the saturation from the ratio of lightness and saturation of the skin not covered with the hair, and it is effective to eliminate the effect of the shade.

Below is explained a method of determining the lightness L of each pixel after change. The lightness assigned to the pixel of point (x0, y0) is supposed to be L0, and the lightness assigned to the pixel of point (x1, y0) to be L1. The lightness L assigned to the pixel of point (X, y0) in this pixel set is determined in Eq. 19.

$$L = L0 \cdot f(x0, x1, X) + L1 \cdot (1 - f(x0, x1, X)) \qquad \text{(Eq. 19)}$$

In Eq. 19, f is a function in the value of $0 \leq f \leq 1$. Herein, L is calculated, assuming L0, L1, and f are same as in the first embodiment.

Finally, smoothing of lightness and saturation on each pixel in the region of the changed pixel and its vicinity is done in the same manner as in the first embodiment.

Embodiment 4

An image processing apparatus in a fourth embodiment of the invention is described below. In this embodiment, a fluctuation generating part is provided in the removal region changing part 12, and only the operation of the removal region changing part 12 is different as compared with the third embodiment.

The operation of the removal region changing part 12 is described.

The fluctuation generating part is to provide the hue, lightness, and saturation with fluctuations, by numerical values occurring randomly, or numerical values generated by probability depending on the mapping pixel position. The distribution of hue, lightness and saturation of the human skin is not smooth, but is somewhat irregular, and by giving fluctuations by using random numerical values, a more real result may be obtained. Moreover, by using numerical values occurring by probability depending on position, wrinkles and spots may be formed.

The operation of the fluctuation generating part is described. A function R is intended to generate integer values in a certain range at random. For example, a function generating integers of −5 or more and 5 or less irregularly is employed. A function F(x, y) is to generate numerical values by probability, from the position in the head contour of the pixel P(x, y) to be mapped. The range and probability of numerical values generated by the function F are determined solely by the wrinkles and spots being provided. First, the hue H, lightness L, and saturation S of the pixel value mapped in the pixel P are determined same as in the third embodiment. Herein, using the function R and function F, L' and S' are determined in Eq. 20.

$$L' = L + R + F(x, y)$$

$$S' = S + R + F(x, y) \qquad \text{(Eq. 20)}$$

The fluctuation generating part changes the removal region 15 by mapping into the pixel P by using L' and S'.

In this embodiment, the function R for generating random numerical values is used, but if a statistical distribution of hue, lightness and saturation of the skin is obtained, numerical values may be generated accordingly, and fluctuations may be given.

Embodiment 5

Figure 10:
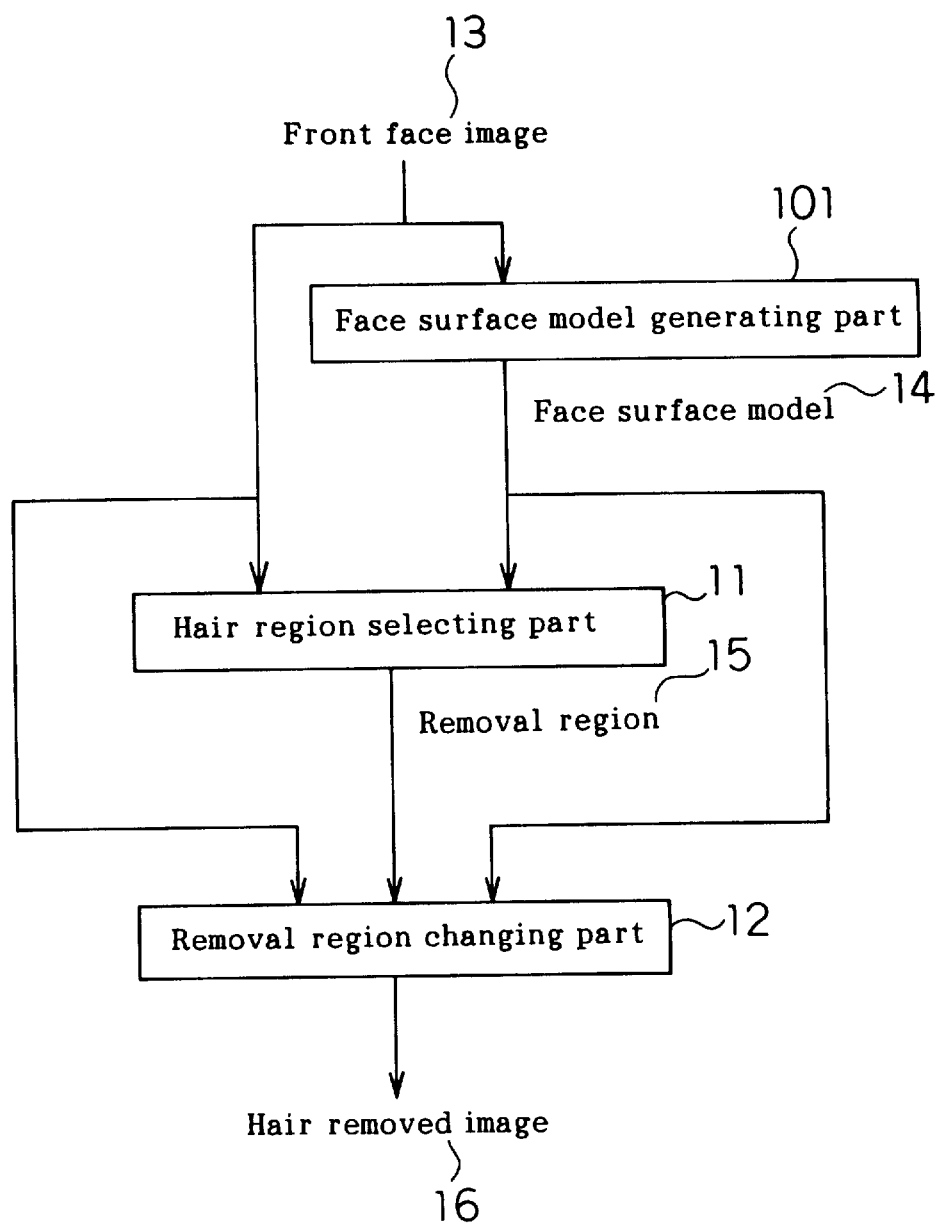
FIG. 10 is a block diagram of an image processing apparatus in a fifth embodiment of the invention.

FIG. 10 is a block diagram of an image processing apparatus in a fifth embodiment of the invention. This embodiment differs from the first embodiment in that a face surface model generating part 101 is provided. The face surface model generating part 101 generates a face surface model 14, which is structural information of the face of the face surface image 13, by using the face surface image 13. The generation of the face surface model 14 by the face surface model generating part 101 conforms to a conventional method disclosed, for example, Japanese Laid-open Patent No. 5-197793 and No. 4-199474.

Embodiment 6

Figure 11:
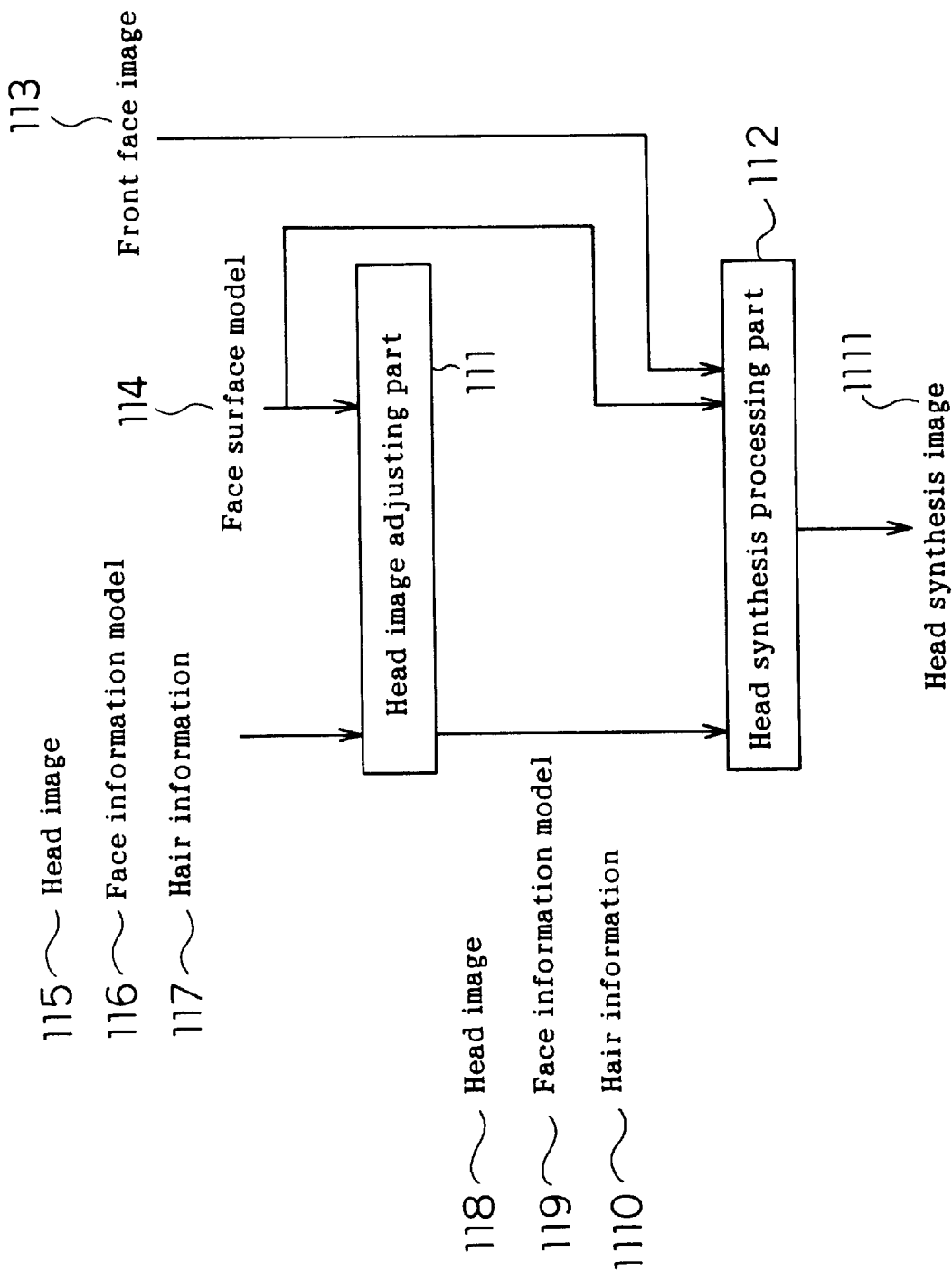
FIG. 11 is a block diagram of an image processing apparatus in a sixth embodiment of the invention.

FIG. 11 is a block diagram of an image processing apparatus in a sixth embodiment of the invention. In FIG. 11, a head image adjusting part 111 applies a specific conversion to a head image 115 and hair image 117 which is attribute of each pixel corresponding to the head image 115, so that the hair style of the head image 115 may be suited to the front face image 113, on the basis of the face surface model 114 and face information model 116. The face surface model 114 expresses the structural information of the face of the front face image 113. The face information model 116 expresses the structural information of the face of the head image 115.

A head synthesis processing part 112 assigns the hair style of the head image 118 converted by the head image adjusting part 111 to the front face image 113, according to the hair information 117 converted by the head image adjusting part 111. A head image 118 is the head image 115 converted by the head image adjusting part 111. A face information model 119 is the face information model 116 converted by the head image adjusting part 111. Hair information 1110 is the hair information 117 converted by the head image adjusting part 111. A head synthesis image 1111 shows the image having the hair style of the head image 118 assigned to the front face image 113.

Figure 12:
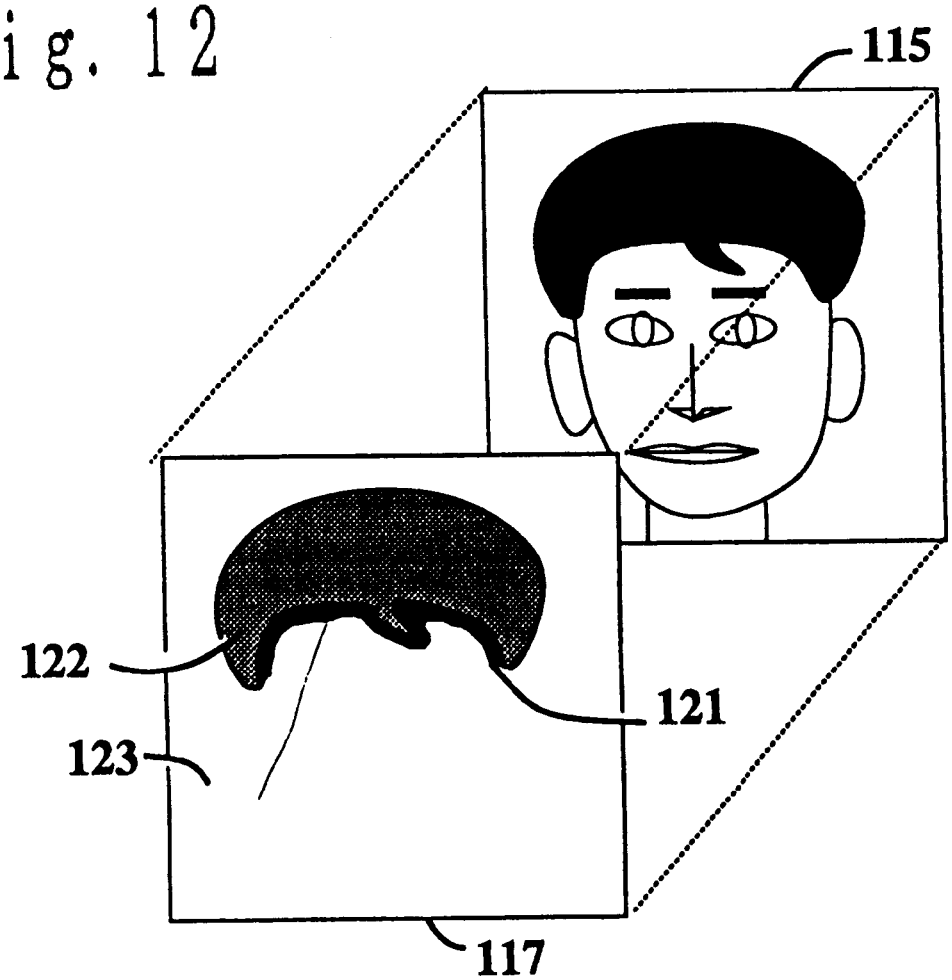
FIG. 12 is a correspondence diagram of head information and hair information in the sixth embodiment.

The front face image 113 and face surface model 114 are same as in the first embodiment. The head image 115 is a digital image taken of a front face being in a size of 256×256 pixels, and is a color image in a width of 8 each of R, G, B per pixel. The face of the head image 115 is looking forward, and the center line of the face is nearly perpendicular. The face information model 116 is similar in composition to the face surface model 114. The hair information 117 is to give an attribute for specifying the assigning method when assigning the head image 115 to the front face image 113. The hair information 117 is in a same size as the head image 115, being in a two-dimensional array having a bit width of 8 bits per pixel, and its attribute is stored in each element of the hair information 117 (see FIG. 12). As shown in FIG. 12, one pixel of this array corresponds to one pixel of the head image 115. That is, supposing the array of the hair information 117 to be A(x, y), A(x0, y0) is the attribute of the pixel of point (x0, y0) of image 115. The attributes used in this embodiment and their meanings are shown in Table 1.

TABLE 1

| Attribute | Meaning |
|---|---|
| 1 | Front hair, hair line, shade of hair |
| 2 | Hair other than 1 |
| 3 | All others |

Table 1 and FIG. 12, reference numeral 121 denotes a region of attribute 1, 122 is a region of attribute 2, and 123 is a region of attribute The operation of the embodiment is described below.

The head image adjusting part 111 adjusts the head image 115 so that the hair style of the head image 115 may be suited to the face of the front face image 113 to be mapped. In this embodiment, as an example of adjustment of the head image 115, the size and position of horizontal and vertical directions of the head contour in the head image 115 are adjusted to the size and position of the horizontal and vertical directions of the head contour in the front face image 113, respectively.

Figure 13:
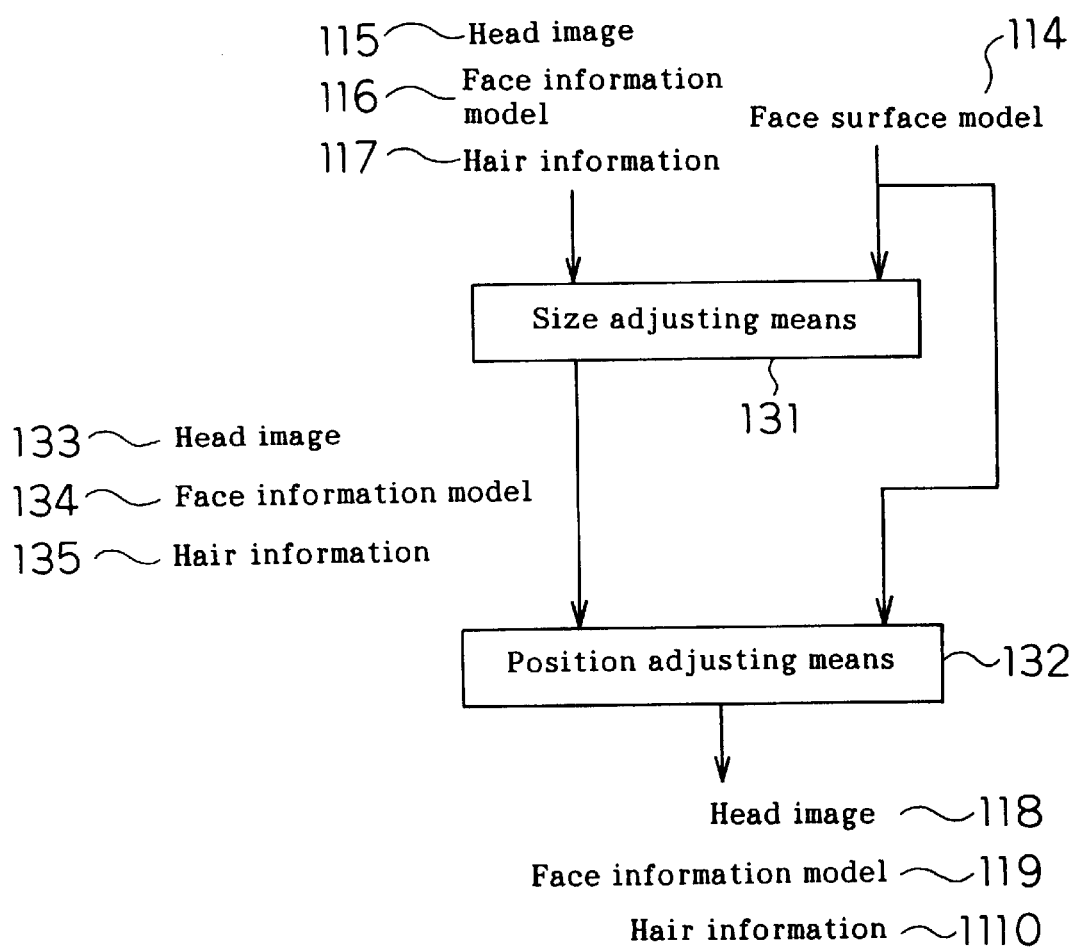
FIG. 13 is a structural diagram of a head image adjusting part 111.

FIG. 13 is a structural diagram of the head image adjusting part 111. Size adjusting means 131 converts the head image 115, face information model 116, and hair information 117, so that the size of the face of the head image 115 may coincide with the size of the face of the front face image 113. A head image 133 is the head image 115 converted by the size adjusting means 131. A face information model 134 is the face information model 116 converted by the size adjusting means 131. The hair information 135 is the hair information 117 converted by the size adjusting means 131.

Position adjusting means 132 converts the head image 133, face information model 134, and hair information 135, so that the position of the head contour in the head image 133 may coincide with the position of the head contour in the front face image 113.

Figure 14:
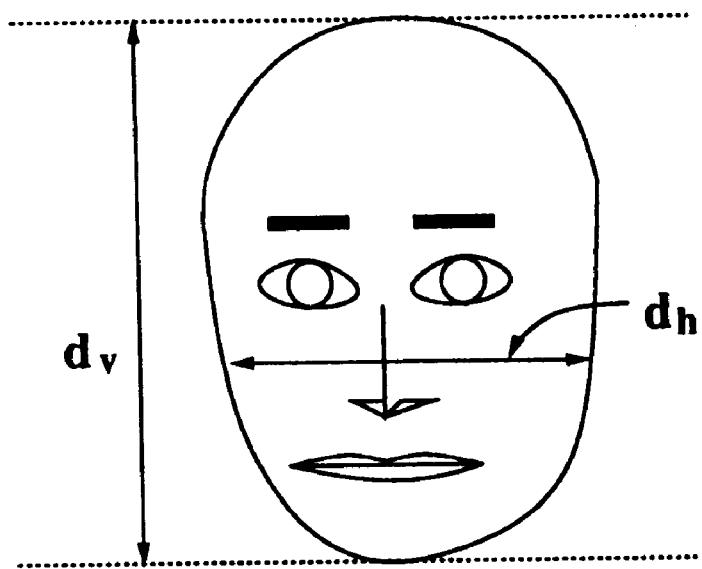
FIG. 14 is an explanatory diagram of operation of size adjusting means in the sixth embodiment.

Processing of the size adjusting means 131 is specifically described. The size adjusting means 131 determines the magnitudes dv and dh of the head contour as shown in FIG. 14, from the face surface model 114. Specifically, dv is the maximum height in the vertical direction (y-axis direction) of the head contour, and dh is the length of the line segment of the section cutting the head contour in the horizontal line passing through the middle point of the eyes and the nose tip. The length of the line segment is the magnitude in the horizontal direction (x-axis direction) of the head contour.

Similarly, the size adjusting means 131 determines the vertical magnitude dv' and horizontal magnitude dh' of the head contour in the head image 115.

The size adjusting means 131 adjusts these magnitudes by scaling at an independent scale factor in the horizontal direction and vertical direction. Supposing the horizontal scale to be Sh and the vertical scale to be Sv, Sh and Sv are given in Eq. 21.

$$Sh = \frac{dh}{dh'}, Sv = \frac{dv}{dv'} \qquad \text{(Eq. 21)}$$

The size adjusting means 131 scales the head images 115 by Sh in the x-axis direction and Sv in the y-axis direction according to Sh and Sv calculated in Eq. 21, and obtains the head image 133.

The hair information 117 is converted into hair information 135 by the same processing as in size adjustment of the head image 115.

The nearest neighbor algorithm is known as one method among conventional methods which are available for the scaling. Besides, the size adjusting means 131 also adjusts the size by multiplying the x-coordinate by Sh times and the y-coordinate by Sv times since the face information model 116 has x-coordinate and y-coordinate in every feature point. That is, an arbitrary vertex P(x, y) of the face information model 116 is converted to a vertex P'(x', y') of the face information model 134 by Eq. 22.

$$x'=x \cdot Sh, \ y'=y \cdot Sv \qquad \text{(Eq. 22)}$$

Next is explained the operation of the position adjusting means 132. Position adjustment is translation of independent displacement amount respectively in the horizontal direction and vertical direction. The displacement in the horizontal direction is supposed to be Δh, and the displacement in the vertical direction to be Δv. Values of Δh and Δv are determined as follows.

Figure 15:
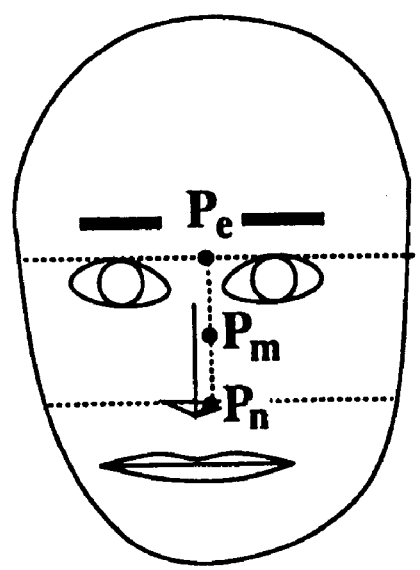
FIG. 15 is a diagram for explaining the operation of position adjusting means 132.

FIG. 15 is a diagram for explaining the operation of the position adjusting means 132. The face in FIG. 15 is the face of the front face image 113. Point Pn expresses a middle point of the line segment of the section cutting the head contour at the position of the tip of the nose in the horizontal direction. Point Pe shows the middle point of the line segment at the highest position of the eye region, of the line segment of the section cutting the head contour in the horizontal direction. Point Pm shows the middle point of the line segment linking point Pn and point Pe.

Similarly, the position adjusting means 132 determines middle point Pn', middle point Pe', and middle point Pm' also for the head image 133. The point Pn' is a middle point of the line segment of the section cutting the head contour at the position of the tip of the nose in the horizontal direction. The point Pe' is the middle point of the line segment at the highest position of the eye region, of the line segment of the section cutting the head contour in the horizontal direction. The point Pm' is a middle point of the line segment linking point Pn' and point Pe'.

Supposing the middle points to be Pm(xf, yf), Pm'(xh, yh), Δh and Δv are given in Eq. 23.

$$\Delta h = xf - xh, \ \Delta v = yf - yh \qquad \text{(Eq. 23)}$$

An arbitrary point P(x, y) on the head image 133 is converted into point P'(X, Y) by Eq. 24, and the head image 118 is generated.

$$X = x + \Delta h, \ Y = y + \Delta v \qquad \text{(Eq. 24)}$$

Similarly, an arbitrary element A(x, y) of the hair information 135 is converted into A'(X, Y), and hair information 1110 is generated. An arbitrary vertex Pf(x, y) on the face information model 134 is converted into Pf'(X, Y), and a face information model 119 is generated.

Processing on the face information model 116 and face information model 134 may be done on all vertices in the face information model 116, but may be also done only on the vertices used in the subsequent processing, such as feature points.

The operation of the head synthesis processing part 112 is described below. The head synthesis processing part 112, same as in the first embodiment, not using the pixel value of R, G, B, converts the color information into hue, lightness and saturation, and uses them by normalizing into integer values of 0 to 255.

Figure 16:
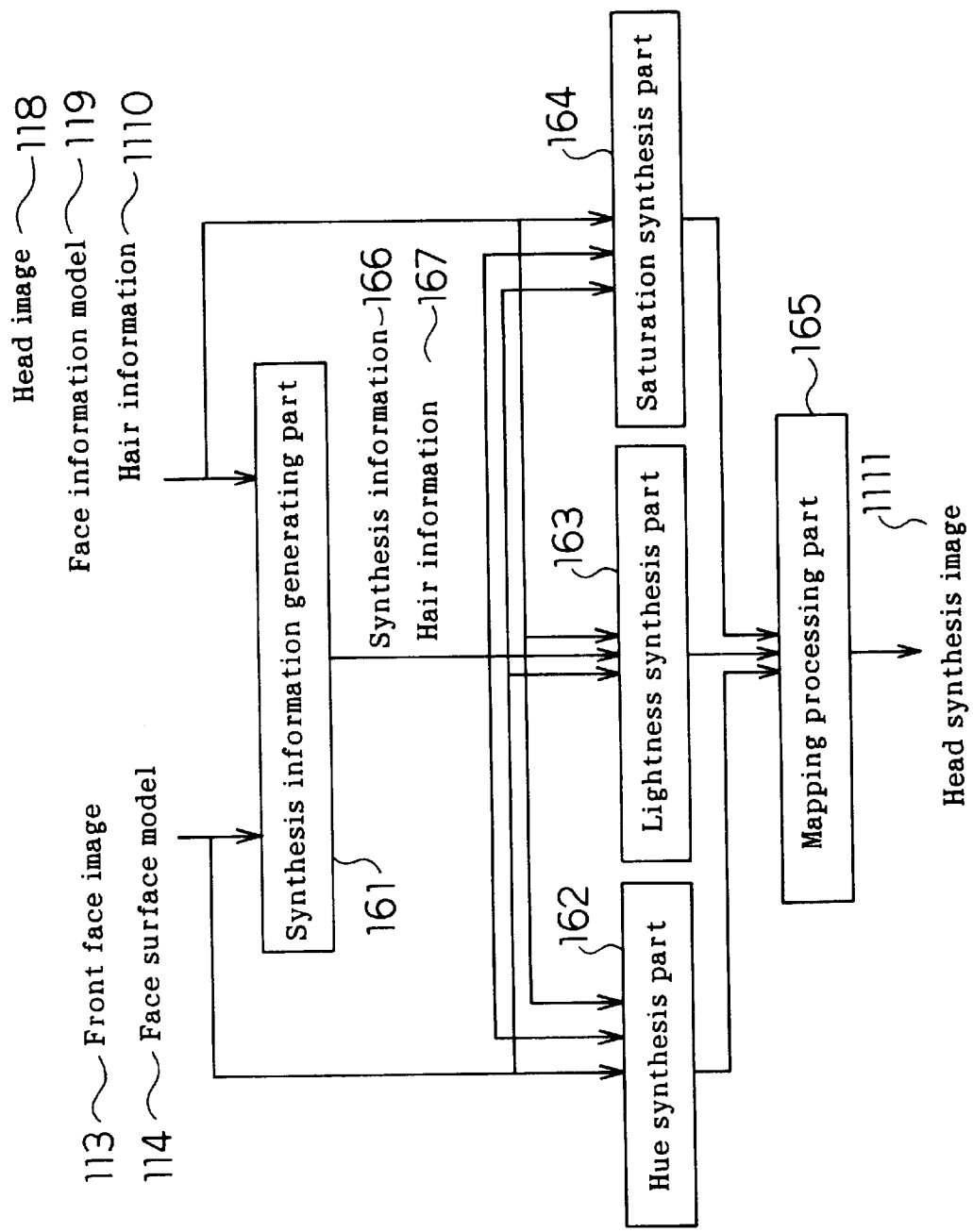
FIG. 16 is a structural diagram of a head synthesis processing part 112.

FIG. 16 is a structural diagram of the head synthesis processing part 112. In FIG. 16, reference numeral 161 is a synthesis information generating part; 162 is a hue synthesis part for generating a hue by using the hue of the front face image 113 and the hue of the head image 118; 163 is a lightness synthesis part for generating a lightness by using the lightness of the front face image 113 and the lightness of the head image 118, according to the attribute of the hair information 167; 164 is a saturation synthesis part for generating a saturation by using the saturation of the front face image 113 and the saturation of the head image 118, according to the attribute of the hair information 167; 165 is a mapping processing part for receiving the hue generated in the hue synthesis part 162, the lightness generated in the lightness synthesis part 163, and the saturation generated in the saturation synthesis part 164, determining the color from them, mapping in the front face image 113, and generating the head synthesis image 1111; 166 is the synthesis information generated by the synthesis information generating part 161; and 167 if the hair information corrected by the synthesis information generating part 161.

The synthesis information generating part 161 generates the synthesis information 166 to be used in generating processing of the hue synthesis part 162, lightness synthesis part 163, and saturation synthesis part 164, from the color information of the front face image 113 and head image 118. At the same time, the synthesis information generating part 161 investigates the color information of the pixels of the front face image 113 at the mapping destination, and corrects the hair information 1110 and outputs the hair information 167. In this embodiment, as an example of synthesis information 166, the average of lightness is used. Correction of the hair information 1110 is, for example, to change the mapping on the pixel small in lightness of the front face image 113 to mapping of attribute 2.

First is explained the operation of the synthesis information generating part 161. The synthesis information generating part 161 determines the average Lha of the lightness with attribute 3 given by the hair information 1110, of the pixels in the region above the eyebrows in the head contour of the head image 118. The synthesis information generating part 161 also searches the pixels of which lightness L of point P(x, y) in the portion above the eyebrows in the head contour in the front face image 113 satisfies Eq. 25.

$$L < \theta 1 \quad (Eq.\ 25)$$

In Eq. 25, θ1 is the threshold, for example, θ1=95. This pixel is a dark pixel, and is high in possibility of being a hair. Accordingly, in order that the pixels satisfying Eq. 25 may not be left over in the head synthesis image 1111, the synthesis information generating part 161 provides A(x, y) of the hair information with attribute 2, and generates hair information 167. Moreover, the synthesis information generating part 161 also determines the average Lfa of the lightness of the pixels not satisfying Eq. 25.

Processing done in the hue synthesis part 162, lightness synthesis part 163, and saturation synthesis part 164 is determined by the attribute of the pixel of the hair information 167. The pixel of attribute 3 is not a hair, and is hence not mapped. The pixel of attribute 1 is a pixel in the portion of the front hair, hair line, and shade by the front hair, and the synthesized value of this pixel value and the pixel value at the mapping destination on the front face image 113 is mapped. The pixel of attribute 2 the pixel element which is mapped directly on the front face image 113.

The operation of the hue synthesis part 162 is described. Supposing the hue of an arbitrary pixel Ph(x, y) of the head image 118 to be Hh, the attribute of the pixel Ph obtained from the hair information 167 to be A(x, y), and the hue of pixel Pf(x, y) of the front face image 113 for mapping the pixel Ph to be Hf, the hue synthesis part 162 generates H according to Eq. 26 by using Hf and Hh, according to A(x, y).

$$H = \begin{cases} \dfrac{Hh + Hf}{2} & [A(x, y) = 1] \\ Hh & [A(x, y) = 2] \\ Hf & [A(x, y) = 3] \end{cases} \quad (Eq.\ 26)$$

Figure 17:
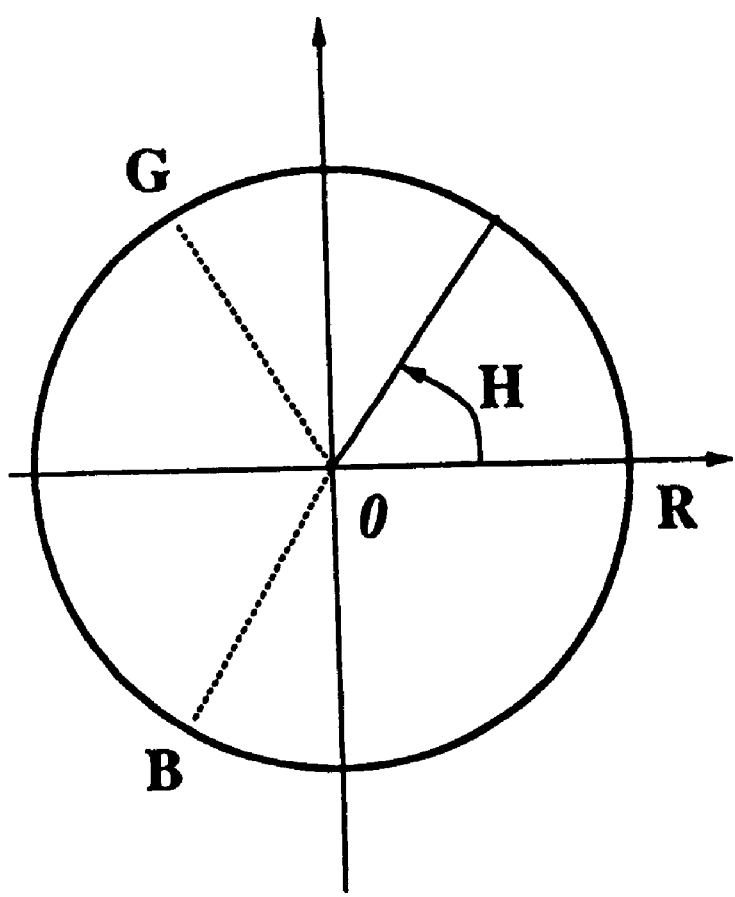
FIG. 17 is an explanatory diagram of color hues.

The hue synthesis part 162 takes the middle value of Hf and Hh in the case of attribute 1. However, since the hue is expressed by the angle as shown in FIG. 17, Hf and Hh are corrected according to Eq. 27 and used.

$$H' = \begin{cases} H - 255 & [H > 128] \\ H & [H \leq 128] \end{cases} \quad (Eq.\ 27)$$

Besides, H is corrected in Eq. 28 and used.

$$H' = \begin{cases} H + 255 & [H < 0] \\ H & [H \geq 0] \end{cases} \quad (Eq.\ 28)$$

The operation of the lightness synthesis part 163 is described below. The lightness of the pixel Ph(x, y) is supposed to be Lh, and the lightness of Pf(x, y) to be Lf. The lightness synthesis part 163 synthesizes L from Lh and Lf, in Eq. 29, by using the averages Lfa and Lha of the lightness obtained from the synthesis information 166.

$$L = \begin{cases} Lfa + Lh - Lha & [A(x, y) = 1] \\ Lh & [A(x, y) = 2] \\ Lf & [A(x, y) = 3] \end{cases} \quad (Eq.\ 29)$$

The lightness synthesis part 163 synthesizes by using the difference from the average in the case of attribute 1.

The operation of the saturation synthesis part 164 is described below. The saturation of the above pixel Ph(x, y) is supposed to be Sh, and the saturation of Pf(x, y) to be Sf. According to Eq. 30, Sf and Sh are synthesized into S.

$$S = \begin{cases} \dfrac{Sh + Sf}{2} & [A(x, y) = 1] \\ Sh & [A(x, y) = 2] \\ Sf & [A(x, y) = 3] \end{cases} \quad (Eq.\ 30)$$

The mapping processing part 165 converts thus synthesized H, L and S into colors of RGB, and maps the colors in the pixel Pf of the front face image 113.

By the 32-bit personal computer having a media processing board with DSP, the operation time of this processing was about 5 seconds.

In this embodiment, both front face image 113 and head image 115 are digital images in a size of 256×256, but the size may be also different.

Also in the embodiment, the face information model is same in composition as the face surface model, but the composition may be also different as far as the eyes, nose, eyebrows, and head contour are obtained.

In the embodiment, in the synthesis when mapping, the same function is used for the hue and saturation, but independent functions may be also used.

As synthesis information, moreover, the average values of hue and saturation of the front face image may be also added, and the average values may be used in the result of synthesis in the case of attribute 1, in the hue synthesis part and saturation synthesis part.

Embodiment 7

Figure 18:
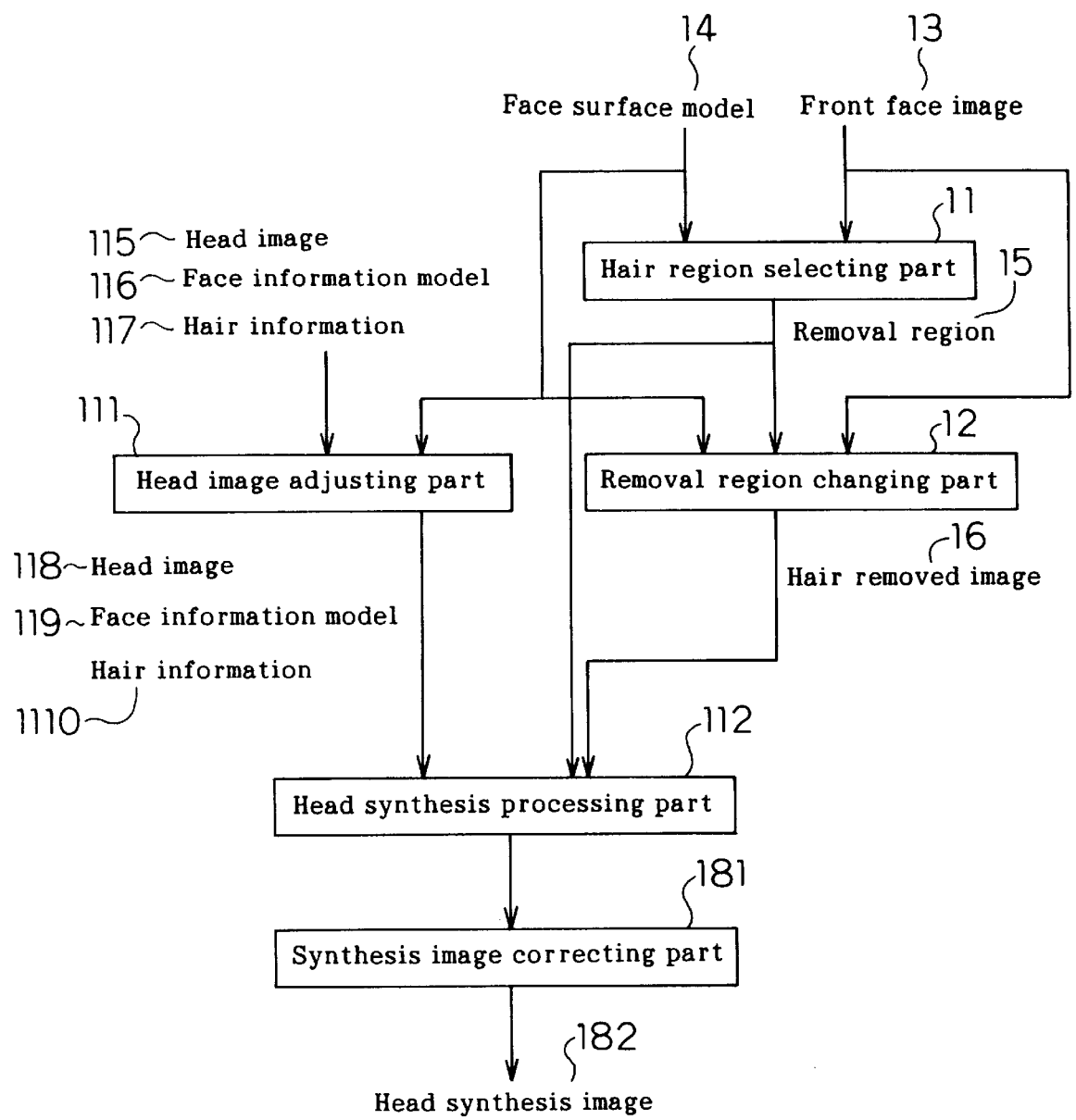
FIG. 18 is a block diagram of an image processing apparatus in a seventh embodiment of the invention.

Referring now to FIG. 18, an image processing apparatus in a seventh embodiment of the invention is described below. In FIG. 18, reference numeral 181 is a synthesis image correcting part for correcting by interpolation, if there is a gap between the face region and hair region, in the mapping result image, and 182 is a head synthesis image which is an output of this image processing apparatus. Processing of hair region selecting part 11 and removal region changing part 12 is same as in the first embodiment, second embodiment, third embodiment, or fourth embodiment. Processing of the head image adjusting part 111 is same as in the sixth embodiment.

The operation of the head synthesis processing part 112 may be different in part from the processing of the synthesis information generating part in the sixth embodiment, and this point is described below. In the image processing apparatus of the embodiment, in the head synthesis processing part 112, the head image 118 is mapped in the hair removed image 16. The hair removed image 16 is an image which the hair and the shade of the hair are removed, and hence the hair information 1110 is not corrected. Hence, in this embodiment, this processing is not done in the synthesis information generating part 161. By inputting the removal region 15, the threshold processing in Eq. 25 is not done, and the average Lfa of the lightness of the pixel not contained in the removal region 15 is determined.

The synthesis image correcting part 181 investigates the mapping result image in every horizontal scanning line, and interpolates if there is a gap between the face region and hair region. However, interpolation is not done if the pixel of the head image 118 mapped at the end point of the hair region is not adjacent to a point on the face contour in the head image 118 or a point in the contour. The contour of the face in the head image 118 is obtained from the face information model 119. Interpolation processing is done in the color of the pixel of the latest face region when the interpolation position is above the middle position of the nose and mouth, and in the color of the pixel of the latest hair region when beneath. If there is a gap to the hair region in the upper part of the forehead, this region is interpolated in the color of the skin of the forehead. After interpolating the gap, the seam of the hair or shade region and face region is smoothed. The method of smoothing is same and mentioned in the first embodiment and others.

Embodiment 8

An eighth embodiment of the invention is described below. In this embodiment, from the input front face image, the region of the hair and the shade of the hair is removed by the image processing apparatus according to the first embodiment, second embodiment, third embodiment or fourth embodiment, and a prepared hair is synthesized in the hair removed image in which the removed region is changed. The head image adjusting part is operated by all or part of the positions of the eyes, nose, mouth and eyebrows obtained from the face surface model and face information model, the distance from the head contour, and position and size of the head contour, and the head synthesis processing part comprises a synthesis information generating part for generating the information used in synthesis of hair removed image and head image, a texture synthesis part for synthesizing texture in a method specified by the attribute of the pixel obtained from the hair information, a mapping processing part for mapping the pixel value synthesized in the texture synthesis part into the hair removed image, and a synthesis image correcting part for correcting the mapping result image. Moreover, the texture synthesis part is composed of a hue synthesis part, a lightness synthesis part, and a saturation synthesis part.

Figure 19:
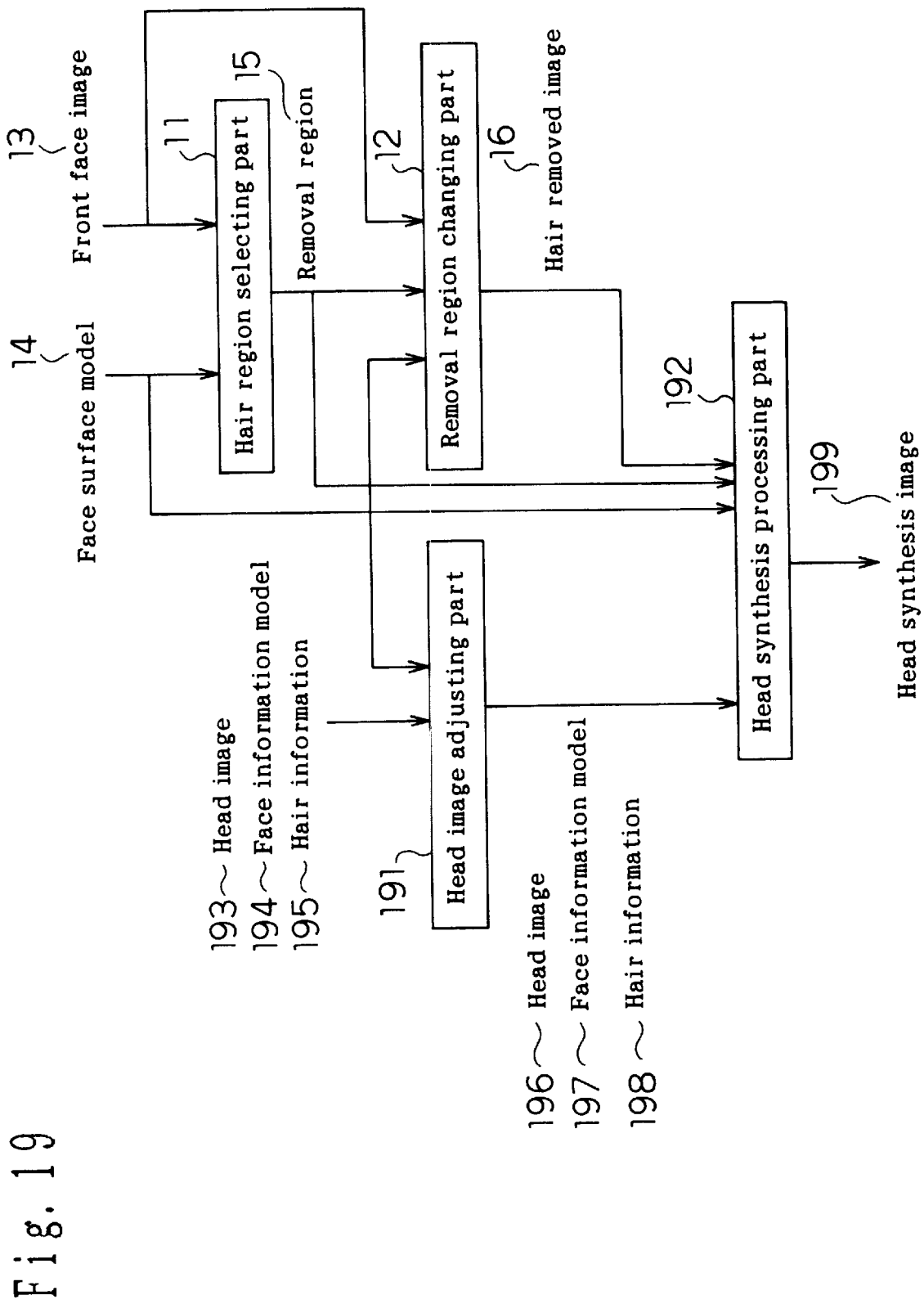
FIG. 19 is a block diagram of an image processing apparatus in an eighth embodiment of the invention.

FIG. 19 is a block diagram of the image processing apparatus of the embodiment. In FIG. 19, reference numeral 191 is a head information adjusting part, 192 is a head synthesis processing part, 193 is a head image, 194 is a face information model expressing the structural information of the face of the head image 193, 195 denotes the hair information expressing the attribute of each pixel of the head information 193, 196 shows the head image after conversion of the head image 193 by the head image adjusting part 191, 197 shows the face information model after conversion of the face information model 194 by the head image adjusting part 191, 198 is the hair information after conversion of the hair information 195 by the head image adjusting part 191, and 199 shows the head synthesis image after synthesis of hair style of the head image 196 in the hair removed image 16.

The input front face image 13 is a color digital image in the width of 8 bits each of R, G, B per pixel, in a size of 256×256 pixels, being taken into the face image take-in device as shown in FIG. 2, same as in the first embodiment and others. The face looks forward, and the center line of the head is nearly perpendicular. The face surface model 14 is also same as in the first embodiment and others. The head image 193 is a digital image taken of a face looking forward, being a color image in the width of 8 bits each of R, G, B in a pixel, in a size of 256×256 pixels. The face in the head image 193 also looks forward, and the center line of the head is nearly perpendicular. The face information model 194 is same in composition as the face surface model 14.

Figure 20:
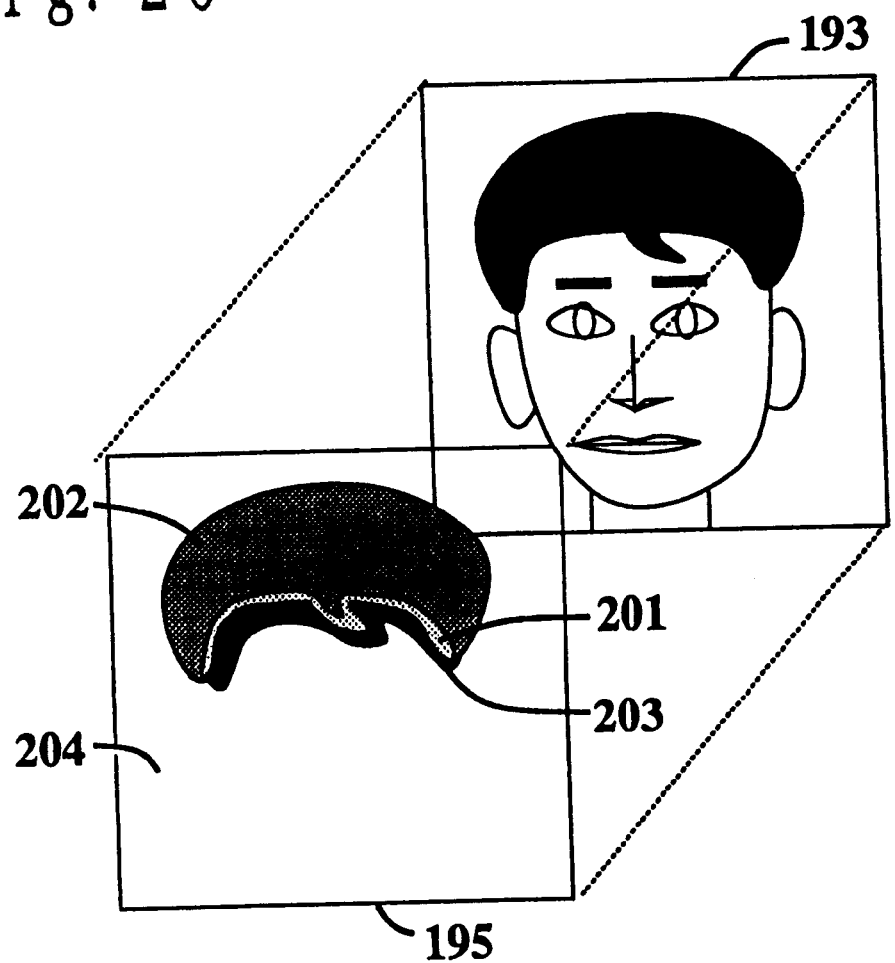
FIG. 20 is a correspondence diagram of head information and hair information in the eighth embodiment.

The hair information 195 is to specify the attribute for determining the method of synthesis, so that the synthesized image may look more naturally, when the pixels of the head image 193 are synthesized with the hair removed image 16. The hair information 195 is same in size as the head information 193, and is a two-dimensional array having a bit width of 8 bits per element. As shown in FIG. 20, one element of this array corresponds to one pixel of the head image 193. That is, supposing the array of the hair information 195 to be A(x, y), A(x0, y0) is the attribute of the pixel of point (x0, y0) of the head image 193.

The attributes used in this embodiment and their meaning are shown in Table 2.

TABLE 2

| Attribute | Meaning |
| --- | --- |
| 1 | Front hair, hair line |
| 2 | Hair other than 1 |
| 3 | Shade of hair |
| 4 | All others |

Table 2 is set up so that the synthesized image may look more real, by shading with the hair or overlapping fine front hair naturally.

In Table 2 and FIG. 20, reference numeral 201 denotes a region of attribute 1, 202 is a region of attribute 2, 203 is a region of attribute 3, and 204 is a region of attribute 4.

The head image adjusting part 191 adjusts the head image 193, so that the hair style of the head image 193 may be suited to the face of the hair removed image 16 to be mapped. In this embodiment, as an example of adjustments of head image 193, the size and position in the horizontal and vertical directions of the head contour in the head image 193 coincide with the size and position in the horizontal and vertical directions of the head contour in the hair removed image 16, respectively.

Figure 21:
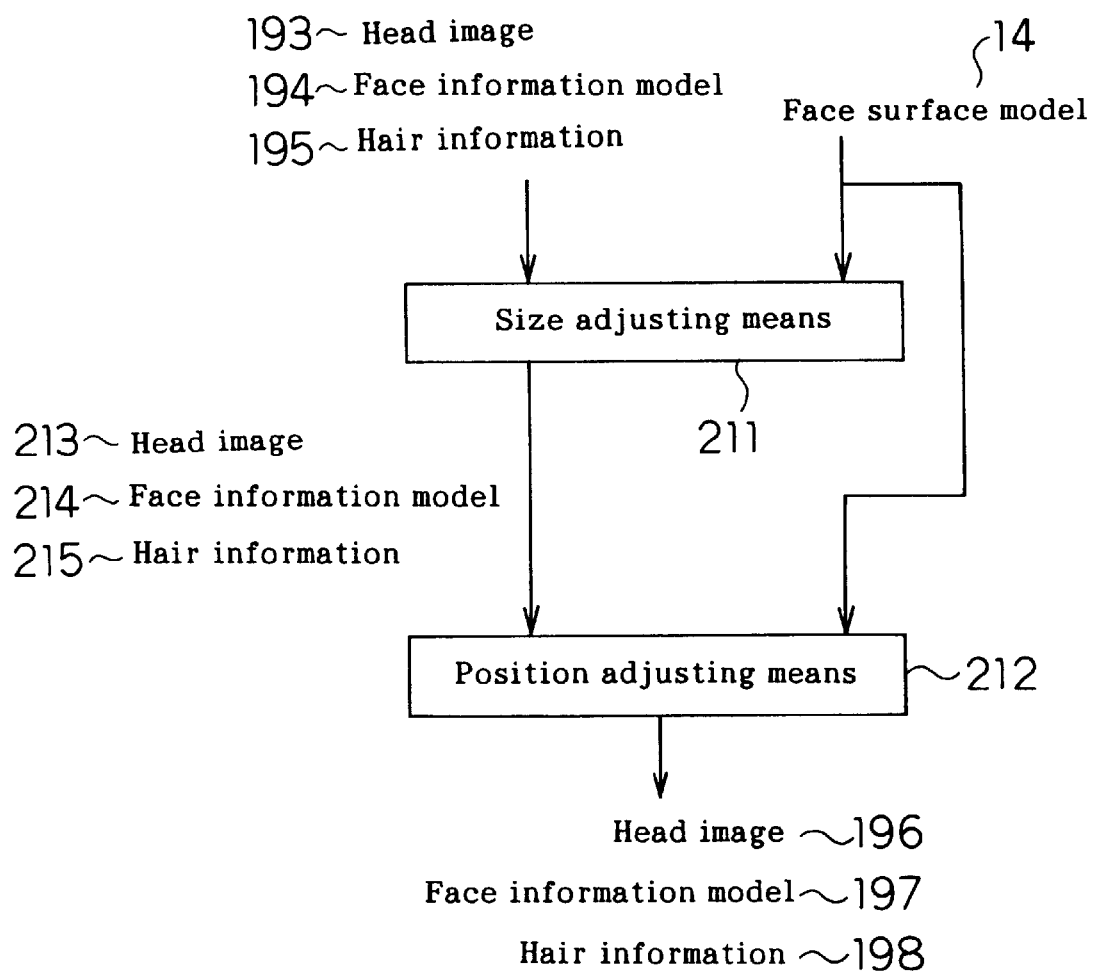
FIG. 21 is a structural diagram of a head image adjusting part 191.

The operation of the head image adjusting part 191 performing such adjustments is described below while referring to FIG. 21. In FIG. 21, reference numeral 211 represents size adjusting means for converting the head image 193, face information model 194, and hair information 195, so that the face size of the head image 193 may coincide with the face size of the hair removed image 16, 213 shows a head image converted by the size adjusting means 211, 214 is a face information model converted by the size adjusting means 211, 215 shows hair information converted by the size adjusting means 211, and 212 denotes position adjusting means for converting the head image 213, face information model 214, and hair information 215, so that the position of the face of the head image 213 in the head image 213 may coincide with the position of the face of the hair removed image 16 in the hair removed image 16.

Figure 22:
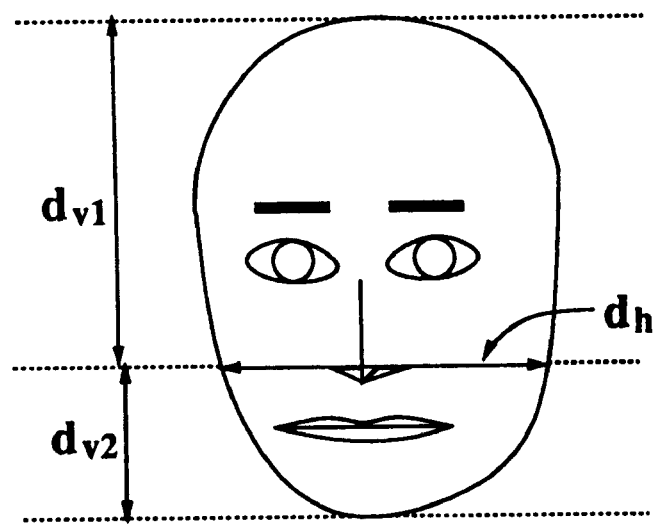
FIG. 22 is an explanatory diagram of operation of size adjusting means in the eighth embodiment.

The operation of the size adjusting means 211 is described. First, from the face surface model 14, head contour magnitudes dv1, dv2, dh as shown in FIG. 22 are obtained. Specifically, dv1 is the distance in the vertical direction (y-axis direction) of the line segment cutting the head contour horizontally at the position of the tip of the nose and the highest point of the head contour, dv2 is the distance in the vertical direction of the line segment cutting the head contour horizontally at the position of the tip of the nose and the lowest point of the head contour, and dh is the length of the line segment of the section cutting the head contour by the horizontal line passing through the point of the tip of the nose, which is the magnitude of the head contour in the horizontal direction (x-axis direction).

Similarly, from the face information model 194, the magnitudes dv1', dv2' of the head contour of the face of the head image 193 in the vertical direction, and the magnitude dh' in the horizontal direction are obtained. Concerning the size adjustment, the head image 193 and hair information are respectively scaled at independent scale factors in the horizontal direction and vertical direction. Moreover, scaling in the vertical direction is done at independent scale factors above and beneath the position of the tip of the nose. Supposing the horizontal scale to be Sh, and the vertical scales to be Sv1, Sv2 above and beneath the position of the tip of the nose, the scale factors are calculated in Eq. 31.

$$Sh = \frac{dh}{dh'}, Sv1 = \frac{dv1}{dv1'}, Sv2 = \frac{dv2}{dv2'} \qquad \text{(Eq. 31)}$$

The size adjusting means 211 scales the head image 193 by Sh in the x-axis direction, and scales by Sv1 and Sv2 in the y-axis direction, and thereby generates a head image 213. By the same processing as size adjustment of the head image 193, the hair information 195 is converted into hair information 215. One method (ex. the nearest neighbor algorithm) among conventional methods may be used for this scaling.

Since the face information model 194 has x-coordinate and y-coordinate corresponding to each feature point, it is converted into a face information model 214 by Eq. 32.

$$x' = x \cdot Sh, \qquad \text{(Eq. 32)}$$
$$y' = \begin{cases} y \cdot Sv1 & [y \le yn] \\ (y - yn \cdot Sv2 + yn \cdot Sv1 & [y > yn] \end{cases}$$

Herein, the y-coordinate of the position of the tip of the nose is supposed to be yn.

The operation of the position adjusting means 212 is described below. The position adjustment is translation by an independent displacement amount individually in the horizontal direction and vertical direction. The displacement in the horizontal direction is supposed to be Δh, and the displacement in the vertical direction to be Δv. The values of Δh and Δv are determined as follows.

Figure 23:
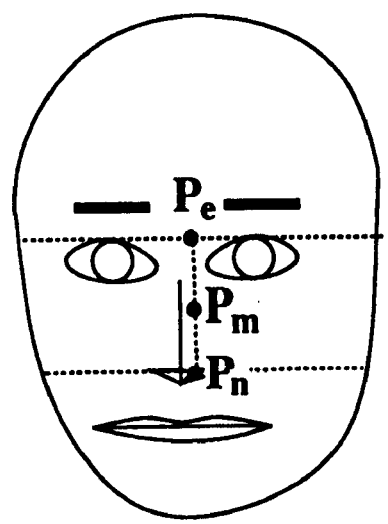
FIG. 23 is a diagram for explaining the operation of position adjusting means in the eighth embodiment.

FIG. 23 is a diagram f or explaining the operation of the position adjusting means 212. The face in FIG. 23 is the face of the hair removed image 16. Point Pn denotes the middle point of the line segment of the section cutting the head contour at the position of the tip of the nose in the horizontal direction, point Pe shows the middle point of the line segment of the section cutting the head contour at the highest point of the eye region in the horizontal direction, and point Pm is the middle point of the line segment linking point Pn and point Pe. The position adjusting means 212, similarly on the head image 213, determines the middle point Pn' of the line segment of the section cutting the head contour at the position of the tip of the nose in the horizontal direction, the middle point Pe' of the line segment of the section cutting the head contour at the highest position of the eye region in the horizontal direction, and the middle point Pm' of the line segment linking the point Pn' and point Pe'.

Herein, supposing these middle points respectively to be Pm(xf, yf), Pm'(xh, yh), the values of Δh and Δv are calculated in Eq. 33.

$$\Delta h = xf - xh, \ \Delta v = yf - yh \qquad \text{(Eq. 33)}$$

An arbitrary point P(x, y) on the head image 23 is converted into point P'(X, Y) in Eq. 34, and a head image 196 is generated.

$$X = x + \Delta h, \ Y = y + \Delta v \qquad \text{(Eq. 34)}$$

Likewise, an arbitrary element A(x, y) of the hair information 214 is converted into A'(X, Y), and hair information 198 is generated. An arbitrary vertex Pf(x, y) on the face information model 214 is also converted into Pf(X, Y), and a face information model 196 is generated.

Processing on the face information model 194 and face information model 214 may be done on all vertices in the face information model 194, but may be done only on vertices used in the subsequent processing such as feature points.

The operation of the head synthesis processing part 192 is described below. In processing in the head synthesis processing part 192, too, same as in the first embodiment and others, instead of using the color information of R, G, B, the pixel value is converted into hue, lightness and saturation, and they are normalized to integer values from 0 to 255 and used.

Figure 24:
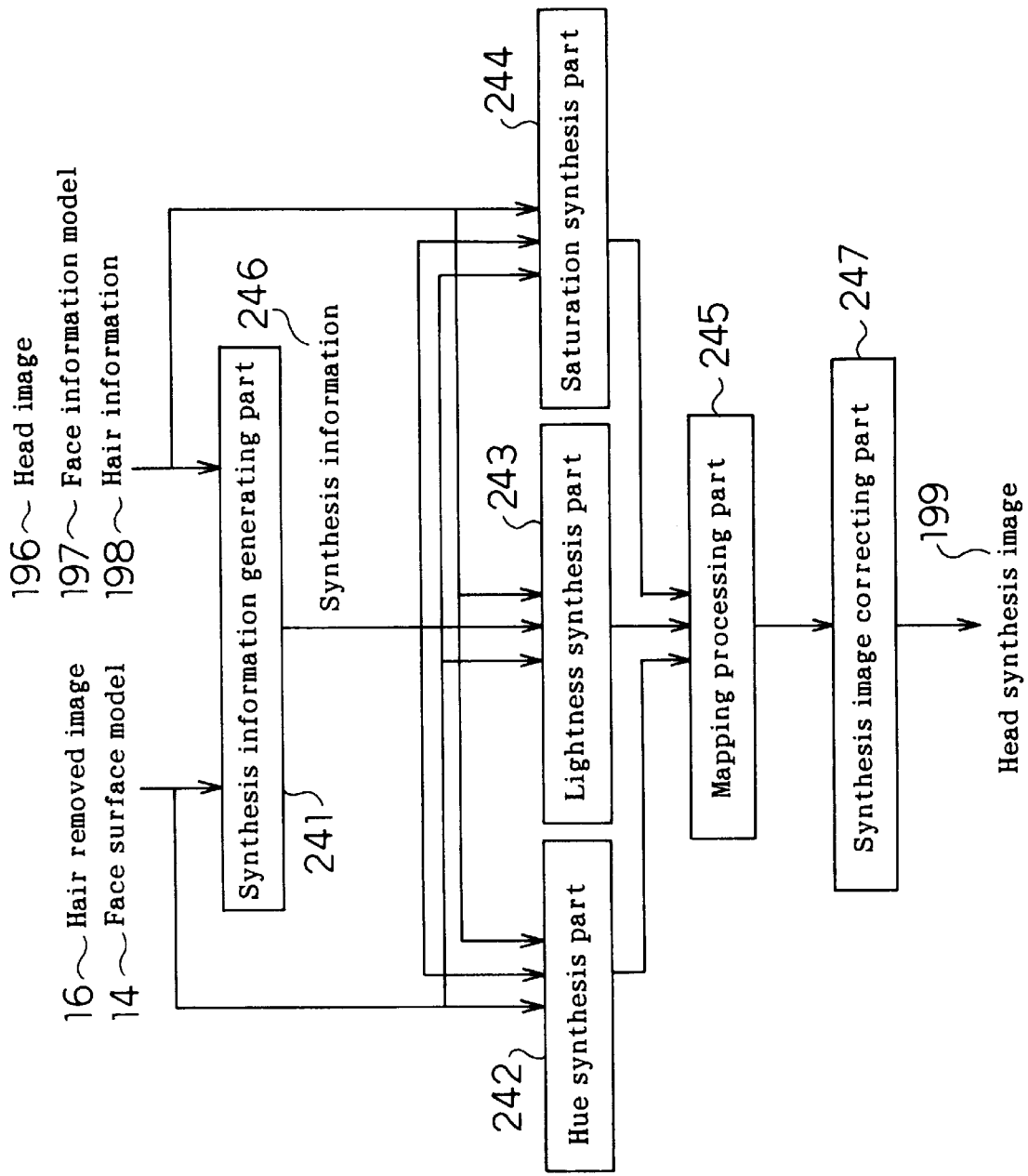
FIG. 24 is a structural diagram of a head synthesis processing part 192.

FIG. 24 is a structural diagram of the head synthesis processing part 192. In FIG. 24, reference numeral 241 is a synthesis information generating part; 242 is a hue synthesis part for generating a hue by using the hue of the hair removed image 16, and the hue of the head image 196 in accordance with the attribute of the hair information 198; 243 is a lightness generating part for generating a lightness by using the beneath the eyes in the head contour in the head image 196. Also, the synthesis information generating part 241 acquires the average La of lightness and average Sa of saturation in the third embodiment as the synthesis information 246.

Processing done in the hue synthesis part 242, lightness synthesis part 243, and saturation synthesis part 244 is determined by the attribute of the hair information 198. Since the pixel of attribute 4 is not a hair, and hence mapping is not done. The pixel of attribute 1 is a pixel of the front hair or hair line, and the synthesized value of this pixel value and the pixel value at the mapping destination on the hair removed image 16 is mapped. The pixel of attribute 2 is the pixel value directly mapped on the hair removed region 16. The pixel of attribute 3 is the shade of the hair, and hence it is processed by slightly lowering the lightness and saturation of the pixel at the mapping destination.

The operation of the hue synthesis part 242 is described. Supposing the hue of an arbitrary pixel Ph(x, y) of the head image 196 to be Hh, the attribute of the pixel Ph obtained from the hair information 198 to be A(x, y), and the hue of the pixel Pf(x, y) of the hair removed image 16 in which the pixel Ph is mapped to be Hf, the hue synthesis part 242 generates H from Eq. 35, by using Hf and Hh, according to A(x, y).

$$H = \begin{cases} Hh & [A(x, y) = 1 \land \mathrm{mod}((x+y), 2) = 0] \\ Hf & [A(x, y) = 1 \land \mathrm{mod}((x+y), 2) = 1] \\ Hh & [A(x, y) = 2] \\ Hf & [A(x, y) = 3, 4] \end{cases} \quad \text{(Eq. 35)}$$

The function mod(a, b) in Eq. 35 is to return the remainder of dividing lightness of the hair removed image 16 and the lightness of the head image 196 in accordance with the attribute of the hair information 198; 244 is a saturation synthesis part for generating a saturation by using the saturation of the hair removed image 16 and the saturation of the head image 196 in accordance with the attribute of the hair information 198; 245 is a mapping processing part for receiving the hue generated by the hue synthesis part 242, the lightness generated by the lightness synthesis part 243, and the saturation generated by the saturation synthesis part 244, converting into colors of R, G, B, and mapping into the hair removed image 16, thereby generating a head synthesis image 199; 246 is synthesis information generated by the synthesis information generating part 241; and 247 is a synthesis image correcting part for correcting by interpolation, if there is a gap between the face region and head region, in the mapping result image. The synthesis information generating part 241 generates and outputs the synthesis information 246 used in synthesis processing in the hue synthesis part 242, lightness synthesis part 243, and saturation synthesis part 244, from the color information of the hair removed image 16 and head image 196. In this embodiment, as an example of the synthesis information 246, the average values of lightness and saturation are used.

First, the operation of the synthesis information generating part 241 is described. The synthesis information generating part 241 determines the average Lha of lightness and average Sha of saturation with attribute 3 or 4 given by the hair information 198, out of the pixels in the region integer "a" by integer "b", and in the case of attribute 1, the hue of the synthesized image is alternately the hue of the head image 196 and hair removed image 16.

The operation of the lightness synthesis part 243 is described. The lightness of the pixel Ph(x, y) is supposed to be Lh, and the lightness of Pf(x, y) to be Lf. The lightness synthesis part 243 synthesizes L from Lh and Lf according to Eq. 36, by using the average values La, Lha of the lightness obtained from the synthesis information 246.

$$L = \begin{cases} \min(Lf, (LA + Lh - Lha)) & [A(x, y) = 1] \\ Lh & [A(x, y) = 2] \\ \min(Lf, (LA - \sigma \cdot (Lha - Lh))) & [A(x, y) = 3] \\ Lf & [A(x, y) = 4] \end{cases} \quad \text{(Eq. 36)}$$

The lightness synthesis part 243 synthesizes by using the difference of average values in the case of attribute 1. The lightness synthesis part 243 lowers the lightness of the skin in the case of attribute 3. Herein, σ is a certain real number, for example, La/Lh. The function min(a, b) is to take either real number "a" or "b", whichever not greater.

The operation of the saturation synthesis part 244 is described. The saturation of the pixel Ph(x, y) is supposed to be Sh, and the saturation of Pf(x, y) to be Sf. The saturation synthesis part 244 synthesizes S from Sf and Sh, according to Eq. 37, by using the average values Sa, Sha of the saturation obtained from the synthesis information 246.

In Eq. 37, a, b, c and d are real numbers satisfying a+b=1,c+d=1, for example, a=0.3, b=0.7, c=0.4, d=0.6.

$$S = \begin{cases} a \cdot Sf + b \cdot Sh & [A(x, y) = 1] \\ Sh & [A(x, y) = 2] \\ c \cdot Sf + d \cdot Sh & [A(x, y) = 3] \\ Sf & [A(x, y) = 4] \end{cases} \quad \text{(Eq. 37)}$$

The mapping processing part 245 converts thus synthesized H, L, S into colors of RGB, and maps the colors in the pixel Pf of the hair removed image 16.

The synthesis image correcting part 247 investigates the mapping result image in every horizontal scanning line, and interpolates if there is a gap between the hair region and the face region not including the hair region. However, interpolation is not done if the pixel of the head image 196 mapped at the end point of the hair region is not adjacent to the point on the head contour in the head image 196, or the point in the head contour.

The head contour in the head image 196 is obtained from the face information model 197. Interpolation processing is done in the color of the pixel in the closest face region when the interpolation position is above the middle position of the nose and mouth, or in the color of the pixel in the closest hair region when beneath. If there is a gap against the hair region in the upper part of the forehead, this region is interpolated in the color of the skin of the forehead. After interpolating the gap, the seam of the head or the shade region and face region is smoothed. The smoothing method is same as mentioned in the first embodiment and others.

By the 32-bit personal computer having a media processing board with DSP, the operation time of this processing was about 8 seconds.

In this embodiment, both front face image 13 and head image 193 are digital images in a size of 256×256, but the size may be also different.

Also in the embodiment, the face information model is same in composition as the face surface model, but the composition may be also different as far as the eyes, nose, eyebrows, and head contour are obtained.

As synthesis information, moreover, the average value of hue of the front face image may be also added, and the average value may be used in the result of synthesis in the case of attribute 1, in the hue synthesis part.

Also in the embodiment, the lightness synthesis part 243 synthesized by using the difference of average values in the case of attribute 1, but synthesis of attribute 1 and attribute 3 may be done by determining the lightness value by the ratio of average values and mapping. That is, instead of Eq. 36, Eq. 38 may be also used.

$$L = \begin{cases} \min\left(Lf, Lh \times \dfrac{Lfa}{Lha}\right) & [A(x, y) = 1] \\ Lh & [A(x, y) = 2] \\ \min\left(Lf, Lh \times \dfrac{Lfa}{Lha}\right) & [A(x, y) = 3] \\ Lf & [A(x, y) = 4] \end{cases} \quad \text{(Eq. 38)}$$

Embodiment 9

Figure 25:
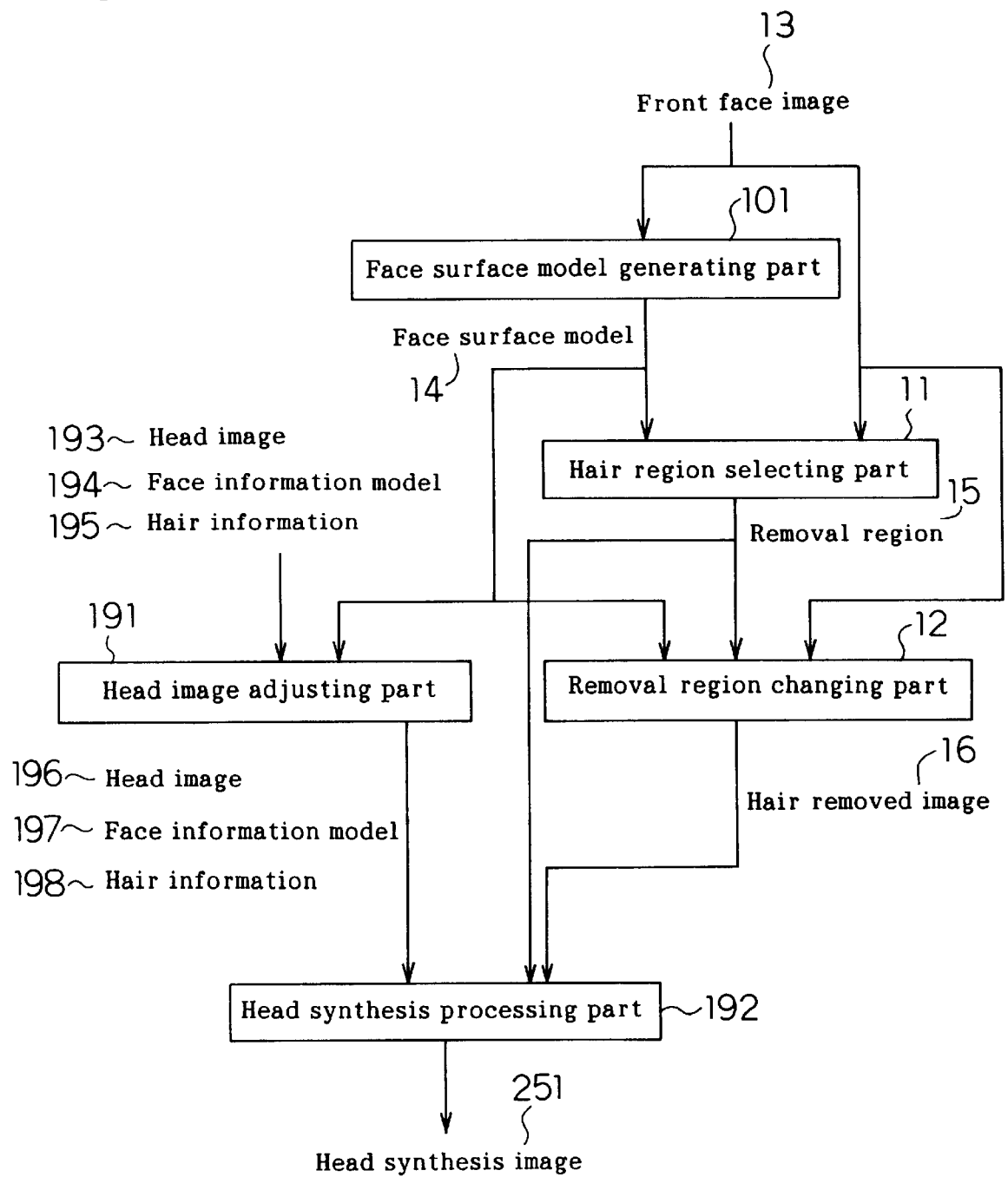
FIG. 25 is a block diagram of an image processing apparatus in a ninth embodiment of the invention.

Referring now to FIG. 25, an image processing apparatus in a ninth embodiment of the invention is described below. This embodiment is similar to the seventh embodiment or eighth embodiment, except that the face surface model 14 generated by the face surface model generating part 101 is fed into the hair region selecting part 11, removal region changing part 12, head image adjusting part 191, and head image synthesis part 192.

Embodiment 10

Figure 26:
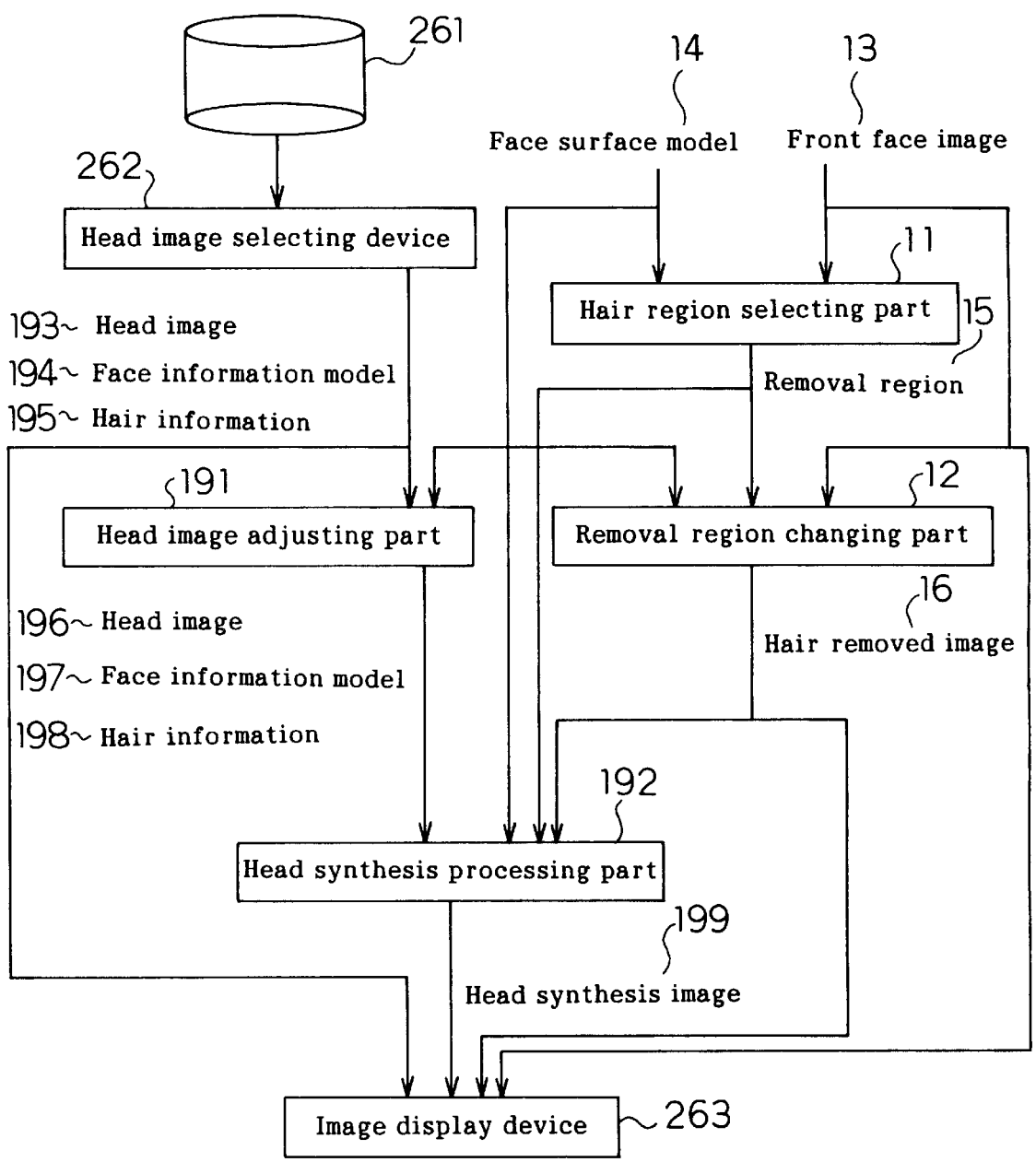
FIG. 26 is a block diagram of a tenth embodiment of the invention.

FIG. 26 is a block diagram of a tenth embodiment of the invention. The embodiment relates to a face image display device composed of the image processing apparatus in the eighth embodiment and image display device. In FIG. 26, reference numeral 261 denotes head image database, 262 is a head image selecting device, and 263 is an image display device. The head image database 261 holds a lot of head images to be synthesized, face information models, and hair information, the head image selecting device 262 selects and outputs certain head image, face information model, and hair information, from the head image database 261. The image display device 263 simultaneously displays the front face image 13, hair removed image 16, hair synthesis image 199 and plural head images obtained from the head image database 262. Since the face surface model 14 and face information model 194 are similar in composition, and hence the head image may be also fed into the front face image 13.

By the face image display device of the embodiment, plural face images can be displayed simultaneously, and the hair styles may be exchanged and displayed. Accordingly, the hair style of the object figure may be replaced with the hair style of other figure and displayed. Or, plural head images may be displayed, and the hair styles may be exchanged. By such face image display device, it is easier to draw an image by selecting the hair style of a certain person, than selecting from the images of hair styles only, when replacing the hair styles.

The foregoing embodiments relate to the synthesis of hair style, but the same method may be also applied in synthesis of face images such as the beard, ears, neck, ornaments and clothes. Such cases are described below.

The present invention is also directed to an apparatus including an image adjusting part for applying a specific conversion to attribute information and the reference image so that a specified portion of an other person may be suited to the front image. The adjusting part applies the specific conversion based on a surface model showing structural information relative to a surface of a person in a front image of the person and an information model showing structural information relative to a surface of the other person in a reference image which is a front image of the other person. The attribute information is information held by a corresponding attribute of each pixel in the reference image to the pixel. The apparatus also includes a synthesis processing part for assigning the front image for a specific portion in the reference image in which the specific conversion is applied according to the attribute information.

The front image of the person is a front face image. The surface model is a face surface model showing structural information relative to a surface of the face of the person. The reference image is a head image which is a front image of a face of the other person having hair. The information model is a face information model showing structural information relative to a surface of the face of the other person in the head image. The specific portion is a head portion including the hair, or the hair and shade of the hair. The attribute information is hair information. The image adjusting part is a head image adjusting part for applying the specific conversion to the hair information and the head image. The head image adjusting part applies the specific conversion to the head image and the hair information utilizing information of head contour and whole or part of eyes, nose, mouth and eyebrows in the face information model. The synthesis processing part is a head synthesis processing part for assigning the front face image for the head portion in the head image in which the specific conversion is applied, according to the hair information.

The head synthesis processing part includes a generating part for generating pixels of the head portion to be assigned to the front face image according to the attribute of each pixel of the hair information using pixel values of the head image corresponding to the pixel of the attribute, or using the pixel value of the head image and pixel value of the front face image. The generating part includes one of:

(1) a hue synthesis part for generating, according to the attribute, a hue using the pixel value of the head image corresponding to the pixel of the attribute, or using the pixel value of the head image and the pixel value of the front face image, corresponding to the pixel of the attribute, (2) a lightness synthesis part for generating, according to the attribute, a lightness using the pixel value of the head image corresponding to the pixel of the attribute, or using the pixel value of the head image and the pixel value of the front face image, corresponding to the pixel of the attribute, and (3) a saturation synthesis part for generating, according to the attribute, a saturation using the pixel value of the head image corresponding to the pixel of the attribute, or using the pixel value of the head image and the pixel value of the front face image, corresponding to the pixel of the attribute.

The head synthesis processing part also includes a mapping processing part for assigning the front face image for each pixel of the head portion generated by the generating part. A synthesis image correcting part is also provided for correcting the front face image in which the head portion is assigned by the mapping processing part.

Figure 27:
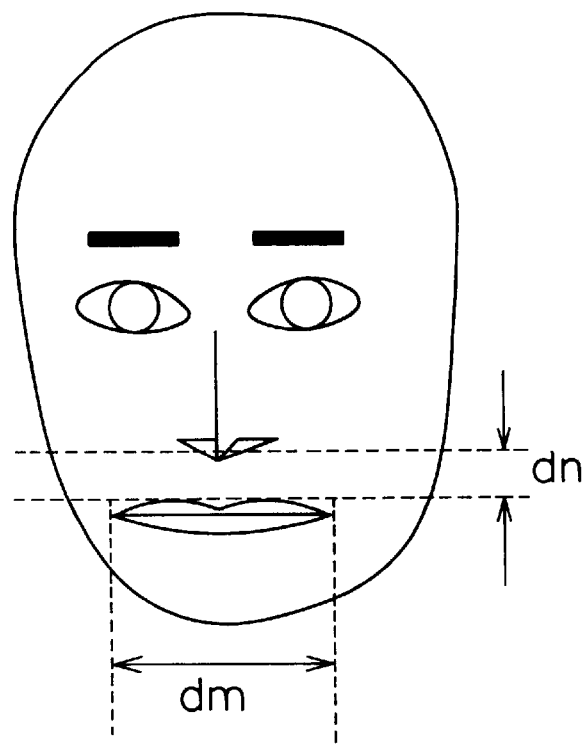
FIG. 27 is an explanatory diagram of operation of size adjusting means when synthesizing the hair.

Processing of beard synthesis is explained in the first place. In this case, attribute 1 or attribute 2 in the hair information is supposed to be the region of the beard in the head image. In FIG. 27, dm denotes the width of the mouth in the horizontal direction, and dn is the distance between the straight line in the horizontal direction passing the highest position of the mouth region, and the straight line in the horizontal direction passing the tip of the nose. This distance is the distance of the mouth and nose. The size is adjusted so that dm and dn in the head image may coincide with dm and dn in the front face image, respectively. That is, the scaling factor Sh in the horizontal direction is determined in Eq. 39, in terms of the width dm of the mouth in the horizontal direction in the front face image, and the width dm' of the mouth in the horizontal direction in the head image.

$$Sh = \frac{dm}{dm'}, Sv = \frac{dn}{dn'} \quad \text{(Eq. 39)}$$

The scaling factor Sv in the vertical direction is determined in Eq. 39, in terms of the distance dn of mouth and nose in the front face image, and the distance dn' of mouth and nose in the head image. Using Sh and Sv, the head image is scaled at the scale factor Sh in the horizontal direction, and scale factor Sv in the vertical direction, and the size is adjusted.

Figure 28:
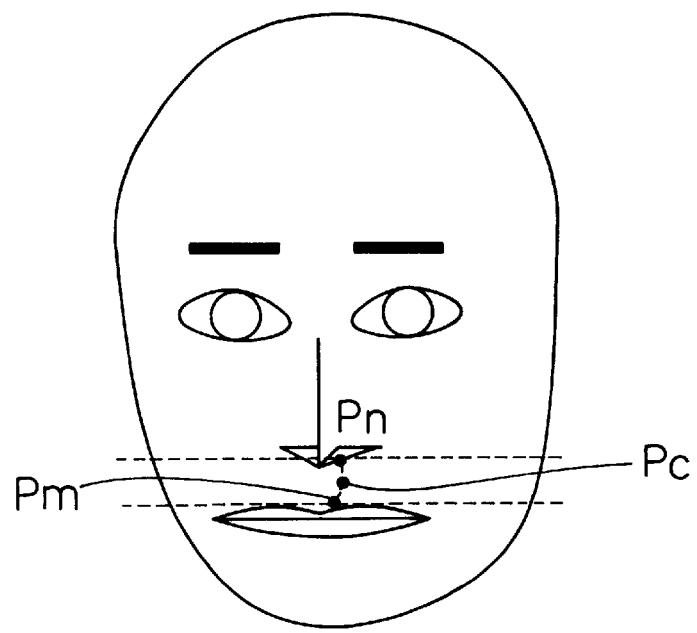
FIG. 28 is an explanatory diagram of operation of position adjusting means when synthesizing the hair.

The adjustment of position when synthesizing the beard is described below. In FIG. 28, Pn is the middle point of the line segment of the section cutting the head contour by the straight line in the horizontal direction passing the tip of the nose. Besides, Pm is the middle point of the line segment of the section cutting the head contour by the straight line in the horizontal direction passing the highest point of the mouth region. Moreover, Pc is the middle point of the line segment linking Pn and Pm, which is the reference point of position adjustment. For position adjustment, the head image is moved parallel so that the reference point Pc in the front face image and reference point Pc' in the head image may be same position in the same screen. Supposing the reference positions to be Pc(xf, yf) and Pc'(xh, yh), respectively, the horizontal moving distance Δh and vertical moving distance Δv are obtained from Eq. 23. The position is adjusted by setting X and Y obtained by putting Δh and Δv into Eq. 24 as the position of the head image. In the head synthesis processing part, the same process as in synthesis of hair style is conducted.

Processing for synthesis of the ears is described. First, aside from the attributes shown in Table 2, attribute 5 relating to the ears is added. In the hair information, the ear region in the head image is set in attribute 5. The size adjustment and position adjustment are done in the same manner as in the case of synthesis of hair style. The head synthesis processing part processes by replacing Eq. 35 in the case of hair style synthesis with Eq. 40, Eq. 36 with Eq. 41, and Eq. 37 with Eq. 42.

$$H = \begin{cases} Hh & [A(x,y) = 1 \wedge \mod((x+y),2) = 0] \\ Hf & [A(x,y) = 1 \wedge \mod((x+y),2) = 1] \\ Hh & [A(x,y) = 2] \\ Hf & [A(x,y) = 3, 4] \\ H0 & [A(x,y) = 5] \end{cases} \quad \text{(Eq. 40)}$$

$$L = \begin{cases} \min, (Lf, (La + Lh - Lha)) & [A(x,y) = 1] \\ Lh & [A(x,y) = 2] \\ \min, (Lf, (Lf, (Lf - \sigma \cdot (Lha - Lh)))) & [A(x,y) = 3] \\ Lf & [A(x,y) = 4] \\ La + Lh - Lha & [A(x,y) = 5] \end{cases} \quad \text{(Eq. 41)}$$

$$S = \begin{cases} a \cdot sf + b \cdot Sh & [A(x,y) = 1] \\ Sh & [A(x,y) = 2] \\ c \cdot Sf + d \cdot Sh & [A(x,y) = 3] \\ Sf & [A(x,y) = 4] \\ Sh & [A(x,y) = 5] \end{cases} \quad \text{(Eq. 42)}$$

Herein, HO in Eq. 40 is the hue of the pixel at a proper position in the face region. In this case, the pixel between eyebrows is used.

Processing for synthesis of ornaments is explained. In this case, each attribute for the region of the ornament in the head image is 2 so that the hair information is constructed. By scaling the head image according to Eq. 43, by using the scale factor Sh of Eq. 21, the size is adjusted.

$$x' = x \cdot Sh, \quad y' = y \cdot Sh \quad \text{(Eq. 43)}$$

As the scale factor, aside from Sh, Sv in Eq. 21, or Sv1 or Sv2 in Eq. 31 may be also used.

The head synthesis processing part processes same as in the synthesis of hair style.

Synthesis of neck and clothes is described. The clothes are processed herein as being attached to the neck. In this case, attribute 5 in the hair information is the region of exposed skin of the neck in the head image. Attribute 2 is the region of the portion of the clothes. The size adjustment and position adjustment are same in the process for synthesis of hair style. The head synthesis processing part processes same as in the synthesis of the ears.

Thus, according to the invention, the hair style synthesized image without strange feel can be generated automatically.

According to the invention, moreover, by using a 32-bit personal computer mounting a media processing board with DSP, the next time from taking the image till completion of hair style synthesis can be processed in about ten seconds.

What is claimed is:

1. An image processing apparatus comprising
    a region selecting part for automatically selecting a region of hair or hair and hair shadow in a front face image of a person, on the basis of each pixel value in whole or part of the front image, and a surface model showing structural information including positions of at least eyes, mouth and eyebrows, relative to a surface of a face of the person in the front face image, and
    a region changing part for automatically changing each pixel value in whole or part of the selected region, on the basis of (a) color information of at least one pixel in the front face image, the at least one pixel being obtained by using said surface model and (b) said surface model,
    wherein
        the front image is a front face image of the face of the person,
        the surface model shows structural information relative to a surface of the face of the person in the front face image including positions of the eyes, nose, mouth and eyebrows in the front face image,
        the region selecting part selects a hair region of the person in the front face image in a removal region, and
        the region changing part changes each pixel value in whole or part of the removal region, on the basis of the structural information in the face surface model including the positions of the eyes, nose, mouth and eyebrows in the front face image, and color information obtained from the at least one pixel value in the front face image.

2. An image processing apparatus of claim 1, wherein the hair has a shade and the hair region selecting part selects the hair of the person as the removal region using the shade of the hair.

3. An image processing apparatus of claim 2, wherein the hair region includes pixel values and the hair region selecting part further changes the pixel values in the hair region to other values.

4. An image processing apparatus of claim 2, wherein the removal region includes an area having first pixel values and a remainder area having second pixel values, and when the first pixel values in the area of the removal region are changed, the removal region changing part further changes the second pixel values in the remainder area to other values than the pixel values in the front face image corresponding to inside of head contour in the face surface model.

5. An image processing apparatus of claim 2, wherein the structural information includes the head contour and eye position and eyebrow position the hair region selecting part selects the hair in response to the head contour and the eye position and the eyebrow position.

6. An image processing apparatus of claim 2, wherein the front face image has pixels having a lightness value and the hair region selecting part selects the hair and the shade of the hair in the removal region in response to the lightness value of each pixel in the front face image.

7. An image processing apparatus of claim 2, wherein the front face image includes pixels having lightness values and saturation values and the hair region selecting part selects the hair in response to the lightness values and the saturation values of each of the pixels.

8. An image processing apparatus of claim 2, further comprising a fluctuation generating part for adding specific fluctuation component to each pixel value in the removal region, on the basis of color information of at least one pixel in the front face image, wherein at least one pixel in the front face image is not included in the removal region.

9. An image processing apparatus of claim 2, further comprising a face surface model generating part for generating the face surface model, on the basis of the front face image.

10. An image processing apparatus of claim 1, wherein the hair region includes pixel values and the hair region selecting part further changes the pixel values in the hair region to other values.

11. An image processing apparatus of claim 1, wherein the removal region includes an area having first pixel values and a remainder area having second pixel values, when the first pixel values in the area of the removal region are changed, the removal region changing part further changes the second pixel values in the remainder area to other values than the pixel values in the front face image corresponding to inside of head contour in the face surface model.

12. An image processing apparatus comprising:

an image adjusting part on the basis of a surface model showing structural information, including positions of at least eyes and nose, relative to a surface of a face of a person in a front image of the person, and a surface model showing structural information including positions of at least eyes and nose, relative to a surface of a face of another person in a reference image which is a front image of the other person, for applying a specific conversion to said reference image and further to attribute information of each pixel of said reference image, so that a hair or hair and hair shadow of said other person may be suited to the front image of said person, and a synthesis processing part for assigning the hair or hair and hair shadow of said other person in the reference image in which the specific conversion is applied, to said front image, according to the attribute information in which the specific conversion is applied wherein said attribute information of each pixel of said reference image, has at least two kinds of attributes with regard to the hair or hair and hair shadow of the other person.

13. An image processing apparatus of claim 12, wherein the front image of the person is a front face image which is a front image of a face of the person, the surface model is a face surface model showing structural information relative to a surface of the face of the person, the reference image is a head image which is a front image of a face of the other person having hair, the information model is a face information model showing structural information relative to a surface of the face of the other person in the head image, the specific portion is head portion comprising the hair, or the hair and shade of the hair, the attribute information is hair information held by corresponding the attribute of each pixel in the head image to the pixel, the image adjusting part is a head image adjusting part for applying the specific conversion to the hair information and the head image, and the synthesis processing part is a head synthesis processing part for assigning the front face image for the head portion in the head image in which the specific conversion is applied, according to the hair information in which the specific conversion is applied.

14. An image processing apparatus of claim 13, wherein the head image adjusting part applies the specific conversion to the head image and the hair information, by utilizing information of head contour and whole or part of eyes, nose, mouth and eyebrows in the face surface model, and information of head contour and whole or part of eyes, nose, mouth and eyebrows in the face information model.

15. An image processing apparatus of claim 13, wherein the head synthesis processing part comprises:

a generating part for generating pixel values of the head portion to be assigned to the front face image, according to the attribute of each pixel of the hair information, by using pixel value of the head image corresponding to the pixel of the attribute, or using the pixel value of the head image and pixel value of the front face image, corresponding to the pixel of the attribute, and a mapping processing part for assigning the front face image for each pixel value of the head portion generated by the generating part.

16. An image processing apparatus of claim 15, further comprising:

a synthesis image correcting part for correcting the front face image in which the head portion is assigned by the mapping processing part.

17. An image processing apparatus of claim 15, wherein the generating part comprises at least one of:

a hue synthesis part for generating, according to the attribute, a hue by using the pixel value of the head image corresponding to the pixel of the attribute, or using the pixel value of the head image and the pixel value of the front face image, corresponding to the pixel of the attribute, a lightness synthesis part for generating, according to the attribute, a lightness by using the pixel value of the head image corresponding to the pixel of the attribute, or using the pixel value of the head image and the pixel value of the front face image, corresponding to the pixel of the attribute, and a saturation synthesis part for generating, according to the attribute, a saturation by using the pixel value of the head image corresponding to the pixel of the attribute, or using the pixel value of the head image and the pixel value of the front face image, corresponding to the pixel of the attribute.

18. An image processing apparatus of claim 13, further comprising a face surface model generating part for generating the face surface model on the basis of the front face image.

19. An image processing apparatus comprising:

a region selecting part for automatically selecting a region of hair or hair and hair shadow in a front face image of a person, on the basis of each pixel value in whole or part of the front image, and a surface model showing structural information including positions of at least eyes, mouth and eyebrows, relative to a surface of a face of the person in the front face image, and a region changing part for automatically changing each pixel value in whole or part of the selected region, on the basis of (a) color information of at least one pixel in the front face image, the at least one pixel being obtained by using said surface model and (b) said surface model, an image adjusting part, on the basis of said surface model of said person, and a surface model showing structural information including positions of at least eyes and nose, relative to a surface of a face of another person in a reference image which is a front image of the other person, for applying a specific conversion to said reference image and further to attribute information of each pixel of said reference image, so that a hair or hair and hair shadow of said other person may be suited to the front image of said person, and a synthesis processing part for assigning the hair or hair and hair shadow of said other person in the reference image to which the specific conversion is applied, to said changed region of said selected region, according to the attribute information to which the specific conversion is applied.

* * * * *

UNITED STATES PATENT AND TRADEMARK OFFICE
CERTIFICATE OF CORRECTION

PATENT NO. : 6,141,431
DATED : October 31, 2000
INVENTOR(S) : Munetsugu et al.

Page 1 of 1

It is certified that error appears in the above-identified patent and that said Letters Patent is hereby corrected as shown below:

Title page,
Item [56] References Cited, Other Publications, insert -- Miyata et al. " A Prototype of Hairstyle Simulation System", IBM research, Tokyo Laboratory, 1995. --

Signed and Sealed this

Sixteenth Day of October, 2001

Attest:

*Nicholas P. Godici*

NICHOLAS P. GODICI
Attesting Officer   *Acting Director of the United States Patent and Trademark Office*